(12) United States Patent
Miura et al.

(10) Patent No.: US 8,185,300 B2
(45) Date of Patent: May 22, 2012

(54) SAFE DRIVING EVALUATION SYSTEM, METHOD, AND PROGRAM

(75) Inventors: Naoki Miura, Toyokawa (JP); Yoshio Yamatani, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 487 days.

(21) Appl. No.: 12/458,864

(22) Filed: Jul. 24, 2009

(65) Prior Publication Data

US 2010/0063725 A1 Mar. 11, 2010

(30) Foreign Application Priority Data

Aug. 7, 2008 (JP) .................................. 2008-203886
Aug. 7, 2008 (JP) .................................. 2008-204370

(51) Int. Cl.
*G01C 21/00* (2006.01)

(52) U.S. Cl. ....... 701/207; 701/29; 701/300; 340/425.5; 340/438

(58) Field of Classification Search .................... 701/29, 701/36, 93, 206, 207, 300; 340/425.5, 435, 340/438, 439

See application file for complete search history.

(56) References Cited

U.S. PATENT DOCUMENTS

| 6,253,150 | B1 | 6/2001 | Nakamura |
| 2005/0131597 | A1 | 6/2005 | Raz et al. |
| 2005/0280520 | A1 * | 12/2005 | Kubo ............................ 340/435 |
| 2007/0027583 | A1 | 2/2007 | Tamir et al. |

FOREIGN PATENT DOCUMENTS

| DE | 10 2005 025 271 A1 | 9/2006 |
| EP | 1 136 792 A2 | 9/2001 |
| JP | A-2000-46574 | 2/2000 |
| JP | A-2004-249821 | 9/2004 |
| JP | 2006277547 A * | 10/2006 |

OTHER PUBLICATIONS

European Search Report issued in European Patent Application No. 09166217.1; Dec. 16, 2009.

* cited by examiner

*Primary Examiner* — Gertrude Arthur Jeanglaude
(74) *Attorney, Agent, or Firm* — Oliff & Berridge, PLC

(57) ABSTRACT

Systems, methods, and programs input a current drive condition of a vehicle at a predetermined location before a predetermined temporary stop position, determine whether there is a possibility that the vehicle will not be able to safely stop at the temporary stop position based on the input current drive condition, and execute a wake-up call to a driver if it is determined that there is a possibility that the vehicle will not be able to stop safely at the temporary stop position. The systems, methods, and programs calculate a wake-up call ratio as a ratio of the total number of wake-up calls executed to the total number of temporary stop positions passed, and then acquire evaluation information based on the calculated wake-up call ratio.

20 Claims, 17 Drawing Sheets

| DEVIATION DEGREE [%] | CORRECTION COUNTING NUMBER |
|---|---|
| 20 ~ | +0.2 |
| 10 ~ 20 | +0.1 |
| 0 ~ 10 | 0 |

40

| EVALUATION ITEM | DRIVE OPERATION | | A1 | A2 | ADVICE DATA |
|---|---|---|---|---|---|
| ACCELERATOR OPENING CHANGE | ACCELERATOR OPENING DECREASE | + | 20 | 10 | DRIVING SAFE BY RELEASING THE ACCELERATOR |
| | NO ACCELERATOR OPENING CHANGE | 0 | 0 | 0 | ABLE TO DRIVE MORE SAFELY BY RELEASING THE ACCELERATOR |
| | ACCELERATOR OPENING INCREASE | − | 10 | 20 | SPEED UP IN FRONT OF TEMPORARY STOP POSITION IS NOT GOOD |
| VEHICLE SPEED CHANGE | VEHICLE SPEED DECREASE | + | 10 | 5 | DRIVING SAFE BY REDUCING SPEED |
| | NO VEHICLE SPEED CHANGE | 0 | 0 | 0 | ABLE TO DRIVE MORE SAFELY BY REDUCING SPEED |
| | VEHICLE SPEED INCREASE | − | 5 | 10 | SPEED UP IN FRONT OF TEMPORARY STOP POSITION IS NOT GOOD |

FIG. 5

| DEVIATION DEGREE [%] | CORRECTION COUNTING NUMBER |
|---|---|
| 20 ~ | +0.2 |
| 10 ~ 20 | +0.1 |
| 0 ~ 10 | 0 |

| EVALUATION SCORE | CORRECTION COUNTING NUMBER |
|---|---|
| -5 ~ 0 | 0 |
| -25 ~ -5 | +0.1 |
| ~ -25 | +0.2 |

| WAKE-UP CALL RATIO [%] | ADVICE SENTENCE |
|---|---|
| 0 ~ 20 | PASSING TEMPORARY STOP POSITIONS SAFELY |
| 20 ~ 100 | ABLE TO PASS TEMPORARY STOP POSITIONS MORE SAFELY BY RELEASING THE ACCELERATOR AND REDUCING SPEED |
| 100 ~ | RELEASE THE ACCELERATOR AND REDUCE SPEED IN FRONT OF TEMPORARY STOP POSITIONS |

| EVALUATION ITEM | DRIVE OPERATION | | A1 | A2 | ADVICE DATA |
|---|---|---|---|---|---|
| ACCELERATOR OPENING CHANGE | ACCELERATOR OPENING DECREASE | + | 15 | 6 | DRIVING SAFE BY RELEASING THE ACCELERATOR |
| | NO ACCELERATOR OPENING CHANGE | 0 | 0 | 0 | ABLE TO DRIVE MORE SAFELY BY RELEASING THE ACCELERATOR |
| | ACCELERATOR OPENING INCREASE | - | 6 | 15 | SPEED UP IN FRONT OF A TEMPORARY STOP POSITION IS NOT GOOD |
| VEHICLE SPEED CHANGE | VEHICLE SPEED DECREASE | + | 10 | 4 | DRIVING SAFE BY REDUCING SPEED |
| | NO VEHICLE SPEED CHANGE | 0 | 0 | 0 | ABLE TO DRIVE MORE SAFELY BY REDUCING SPEED |
| | VEHICLE SPEED INCREASE | - | 4 | 10 | SPEED UP IN FRONT OF A TEMPORARY STOP POSITION IS NOT GOOD |
| FOLLOWING DISTANCE CHANGE | FOLLOWING DISTANCE INCREASE | + | 6 | 3 | DRIVING SAFE BY HAVING A LONG FOLLOWING DISTANCE |
| | NO FOLLOWING DISTANCE CHANGE | 0 | 0 | 0 | ABLE TO DRIVE MORE SAFELY BY HAVING A LONG FOLLOWING DISTANCE |
| | FOLLOWING DISTANCE DECREASE | - | 3 | 6 | NARROWING A FOLLOWING DISTANCE IN FRONT OF A TEMPORARY STOP POSITION IS NOT GOOD |
| FACE ORIENTATION CHANGE | CONTINUE LOOKING FORWARD | + | 4 | 2 | DRIVING SAFE BY CONFIRMING FRONT SITUATION |
| | LOOKING FRONT BY NOTIFICATION | 0 | 0 | 0 | ABLE TO DRIVE MORE SAFELY BY CONFIRMING FRONT SITUATION |
| | NOT LOOKING FORWARD EVEN AFTER GUIDANCE | - | 2 | 4 | TRY TO DRIVE LOOKING FORWARD |

FIG. 13

SAFE DRIVING EVALUATION SYSTEM, METHOD, AND PROGRAM

INCORPORATION BY REFERENCE

The disclosures of Japanese Patent Applications Nos. 2008-204370 and 2008-203886, filed on Aug. 7, 2008, including the specifications, drawings, and abstracts thereof, are incorporated herein by reference in their entirety.

BACKGROUND

1. Related Technical Fields

Related technical fields include safe driving evaluation systems and safe driving evaluation programs for evaluating whether or not a driver could drive a vehicle safely before a temporary stop position.

2. Related Art

Conventionally, a technology is known in which, before a temporary stop position, it is notified to a driver of a vehicle that there is a point in the travel direction where a stop is required. In Japanese Patent Application Publication No. JP-A-2000-46574, for example, a technology is described in which when a host vehicle approaches within a predetermined distance from the temporary stop position, such information is notified to the driver, then if a current vehicle speed meets a predetermined condition, a wake-up call is executed to the driver by displaying a speed reduction warning and concurrently generating a warning beep.

SUMMARY

The technology described in Japanese Patent Application Publication No. JP-A-2000-46574 realizes to encourage the driver to reduce the vehicle speed enough to stop the vehicle safely at the temporary stop position, by setting the above-mentioned wake-up call to be executed in a case where the current vehicle speed is greater than a warning start speed which is determined based on a relation between a distance to the temporary stop position and the vehicle speed. However, in the technology described in Japanese Patent Application Publication No. JP-A-2000-46574, a notification and the wake-up call are executed to the driver unilaterally, and any feedback based on a drive operation of the driver who received the notification or the wake-up call is not given. That is, whether or not reducing the speed sufficiently beforehand following such notification or wake-up call is up to the driver. Therefore, the system does not encourage the driver to actively practice a favorable driving conduct that contributes to safe driving.

In light of the problems described above, it is an object of the present invention to provide a safe driving evaluation system and a safe driving evaluation program that enables the driver to keep an intention high to practice appropriate driving for stopping the vehicle safely at the temporary stop position.

Examples of the broad inventive principles described herein provide systems, methods, and programs that input a current drive condition of a vehicle at a predetermined location before a predetermined temporary stop position, determine whether there is a possibility that the vehicle will not be able to safely stop at the temporary stop position based on the input current drive condition, and execute a wake-up call to a driver if it is determined that there is a possibility that the vehicle will not be able to stop safely at the temporary stop position. The systems, methods, and programs calculate a wake-up call ratio as a ratio of the total number of wake-up calls executed to the total number of temporary stop positions passed, and then acquire evaluation information based on the calculated wake-up call ratio.

With the above-mentioned structure, the wake-up call ratio is calculated each time the vehicle passes the temporary stop position, and the evaluation information based on the wake-up call ratio is acquired. Therefore, it is possible to notify, from the objective perspective, to the driver to what extent the driver is practicing safe driving before the temporary stop position as a general trend, based on the evaluation information. Consequently, it becomes possible to raise the driver's awareness of the safe driving at the temporary stop position. In other words, it enables the driver to keep the intention high to practice appropriate driving for stopping the vehicle safely at the temporary stop position.

Here, the safe driving evaluation system is preferable to include a standard condition acquisition unit that acquires a standard drive condition representing a minimum required drive condition that should be fulfilled at the predetermined location in order to stop safely at the temporary stop position; and a determination unit that determines, based on the current drive condition of the vehicle and the standard drive condition, whether or not there is a possibility of not being able to stop safely at the temporary stop position.

With this structure, it is possible to appropriately determine whether or not there is a possibility of not being able to stop safely at the temporary stop position, by comparing the standard drive condition with the current drive condition of the vehicle.

In addition, the safe driving evaluation system is preferable to include a deviation degree acquisition unit that acquires a deviation degree representing a degree of a deviation between the current drive condition of the vehicle and the standard drive condition, wherein the ratio calculation unit, in calculating the wake-up call ratio, corrects the wake-up call ratio for each of the temporary stop positions where the wake-up call was executed, according to the deviation degree.

With this structure, for example, the larger the deviation degree is, the greater the number of the wake-up calls for calculating the wake-up call ratio is corrected to become. This realizes to increase the wake-up call ratio larger than usual in a case where the driver was practicing drive operation such that the deviation degree from the standard drive condition becomes large when passing through a temporary stop position. The increase of the wake-up call ratio leads to a low evaluation. Therefore, an adaptation of the above-mentioned structure enables the driver to keep an intention high to practice safe driving according to the standard drive condition.

In addition, the safe driving evaluation system is preferable to include an evaluation score acquisition unit that derives and acquires an evaluation score given by quantifying and evaluating a degree of safe driving for stopping safely at the temporary stop position, wherein the ratio calculation unit, in calculating the wake-up call ratio, corrects the wake-up call ratio for each of the temporary stop positions where the wake-up call was executed, according to the evaluation score.

With this structure, for example, the lower the evaluation score is, the greater the number of the wake-up calls for calculating the wake-up call ratio is corrected to become. This realizes to increase the wake-up call ratio larger than usual in a case where the evaluation score was low when passing through a temporary stop position. The increase of the wake-up call ratio leads to a low evaluation. Therefore, an adaptation of the above-mentioned structure enables the driver to keep an intention high to practice safe driving that allows a high evaluation score to be derived.

In addition, the safe driving evaluation system is preferable to include an accident information acquisition unit that acquires information on the number of accidents occurred in the past at each temporary stop position, wherein the ratio calculation unit, in calculating the wake-up call ratio, corrects the wake-up call ratio for each of the temporary stop positions where the wake-up call was executed, according to the number of accidents at the each of the temporary stop positions.

With this structure, for example, the larger the number of the past accidents at each temporary stop positions is, the greater the number of the wake-up calls for calculating the wake-up call ratio is corrected to become. This realizes to increase the wake-up call ratio larger than usual in a case where the wake-up call was executed when passing through a temporary stop position with a large number of accidents. The increase of the wake-up call ratio leads to a low evaluation. Therefore, an adaptation of the above structure enables the driver to keep an intention high to practice safe driving with greater care at a temporary stop position with a large number of accidents.

In addition, the safe driving evaluation system is preferable to include a stop ratio acquisition unit that acquires stop ratio information as statistic information relating to a stop ratio representing a ratio that the vehicle actually conducts a temporary stop at each temporary stop position, wherein the ratio calculation unit, in calculating the wake-up call ratio, corrects the wake-up call ratio for each of the temporary stop positions where the wake-up call was executed, according to the stop ratio.

With this structure, for example, the higher the ratio of the vehicle actually conducting a temporary stop at each temporary stop position is, the greater the number of the wake-up calls for calculating the wake-up call ratio is corrected to become. This realizes to increase the wake-up call ratio larger than usual in a case where the wake-up call was executed when passing through a temporary stop position with a high stop ratio. The increase of the wake-up call ratio leads to a low evaluation. Therefore, an adaptation of the above structure enables the driver to keep an intention high to practice safe driving at a temporary stop position with a high stop ratio.

In addition, the safe driving evaluation system is preferable to further include a preceding vehicle detection unit that detects that another vehicle exists within a predetermined distance ahead of host vehicle, wherein the ratio calculation unit, if it is detected that another vehicle exists ahead of the host vehicle at the predetermined location, excludes the temporary stop position corresponding to such location from targets for calculating the wake-up call ratio.

If another vehicle exists ahead of the host vehicle, there are cases in which it is not possible to appropriately determine whether or not there is a possibility of not being able to stop safely at the temporary stop pint depending on a relation to the other vehicle. Here, an adaptation of the above-mentioned structure makes the calculated wake-up call ratio to be closer to the actual situation and allows to inform the driver of more appropriate evaluation information.

In addition, it is preferable that the drive condition is at least one of a vehicle speed, a braking operation level, and an accelerator opening.

With this structure, based on at least one of the vehicle speed, the braking operation level, and the accelerator opening, which are important elements for stopping the vehicle at the temporary stop position, it is possible to appropriately determine whether or not there is a possibility of not being able to stop safely at the temporary stop position.

In addition, it is preferable that the evaluation information acquisition unit acquires, as the evaluation information, information of at least one of a point assigned according to the wake-up call ratio, an advice sentence having contents corresponding to the wake-up call ratio, and a graphic display visually showing the wake-up call ratio at each moment.

With this structure, it is possible to appropriately inform the driver of evaluation contents according to the wake-up call ratio.

In addition, the safe driving evaluation system is preferable to further include an information collection unit that collects information relating to the wake-up call ratio from a plurality of vehicles, wherein the evaluation information acquisition unit acquires, based on the information collected by the information collection unit, information of one or both of an order of each of the vehicles relating to the wake-up call ratio obtained by a comparison with the other vehicles and a rank assigned based on the past wake-up call ratio of each of the vehicles obtained by the comparison with the other vehicles, as the evaluation information.

With this structure, in a case of collecting information relating to the wake-up call ratio from the plurality of the vehicles, the contents of the evaluation information can be evaluation contents based on the comparison with the other vehicles. Consequently, it is possible to more appropriately inform the driver of the evaluation contents according to the wake-up call ratio.

In addition, the safe driving evaluation system is preferable to include an in-vehicle terminal device mounted in the vehicle and a central control device installed communicable with a plurality of the in-vehicle terminal devices, wherein the in-vehicle terminal device, when a main power of the vehicle mounted with the in-vehicle terminal device has been turned off, sends information relating to the wake-up call ratio from on to off of the main power to the central control device, and the central control device generates the evaluation information for the in-vehicle terminal device based on the information relating to the wake-up call ratio received from the in-vehicle terminal device.

With this structure, it becomes possible to collect in the central control device information relating to the wake-up call ratio from the in-vehicle terminal device installed in each of the plurality of the vehicles and to generate the evaluation information for each in-vehicle terminal device based on the information relating to the wake-up call ratio for the plurality of the vehicles. Consequently, it becomes possible to provide the in-vehicle terminal device with the evaluation information with appropriate contents based on the comparison among the plurality of the vehicles. In addition, the information relating to the wake-up call ratio from on to off of the main power is sent to the central control device when the main power of the vehicle mounted with the in-vehicle terminal device has been turned off. Therefore, it is possible to collect in the central control device, in a small number of communication times, the information relating to the wake-up ratio while the main power of the vehicle is on. Thus, it becomes possible to efficiently collect a lot of information in the central control device and to provide the in-vehicle terminal device with more appropriate evaluation information.

The technical characteristics of the safe driving evaluation system comprising the respective structures described above can be applied to a safe driving evaluation method and the safe driving evaluation program. Therefore, such method and program can be in the scope of the right of the present invention.

In such case, the safe driving evaluation program causes a computer to perform the functions of: executing a wake-up call to a driver if it is determined based on a current drive condition of a vehicle at a predetermined location before a temporary stop position that there is a possibility of not being able to stop safely at the temporary stop position; calculating a wake-up call ratio as a ratio of the number of wake-up calls, which corresponds to the number of temporary stop positions where the wake-up call was executed, to the number of passed positions, which corresponds to the number of temporary stop positions where the vehicle passed; and acquiring evaluation information based on the wake-up call ratio.

Naturally, the safe driving evaluation program can obtain the effects according to the above-mentioned safe driving evaluation system. Further, several additional technologies described as examples of the preferable structure can be applied.

BRIEF DESCRIPTION OF THE DRAWINGS

FIG. 5 shows an example of evaluation score data and advice data stored in a memory.

FIG. 13 shows an example of an evaluation score table (an advice sentence table) stored in the memory.

DETAILED DESCRIPTION OF EXAMPLES

I. First Example

Figure 1:
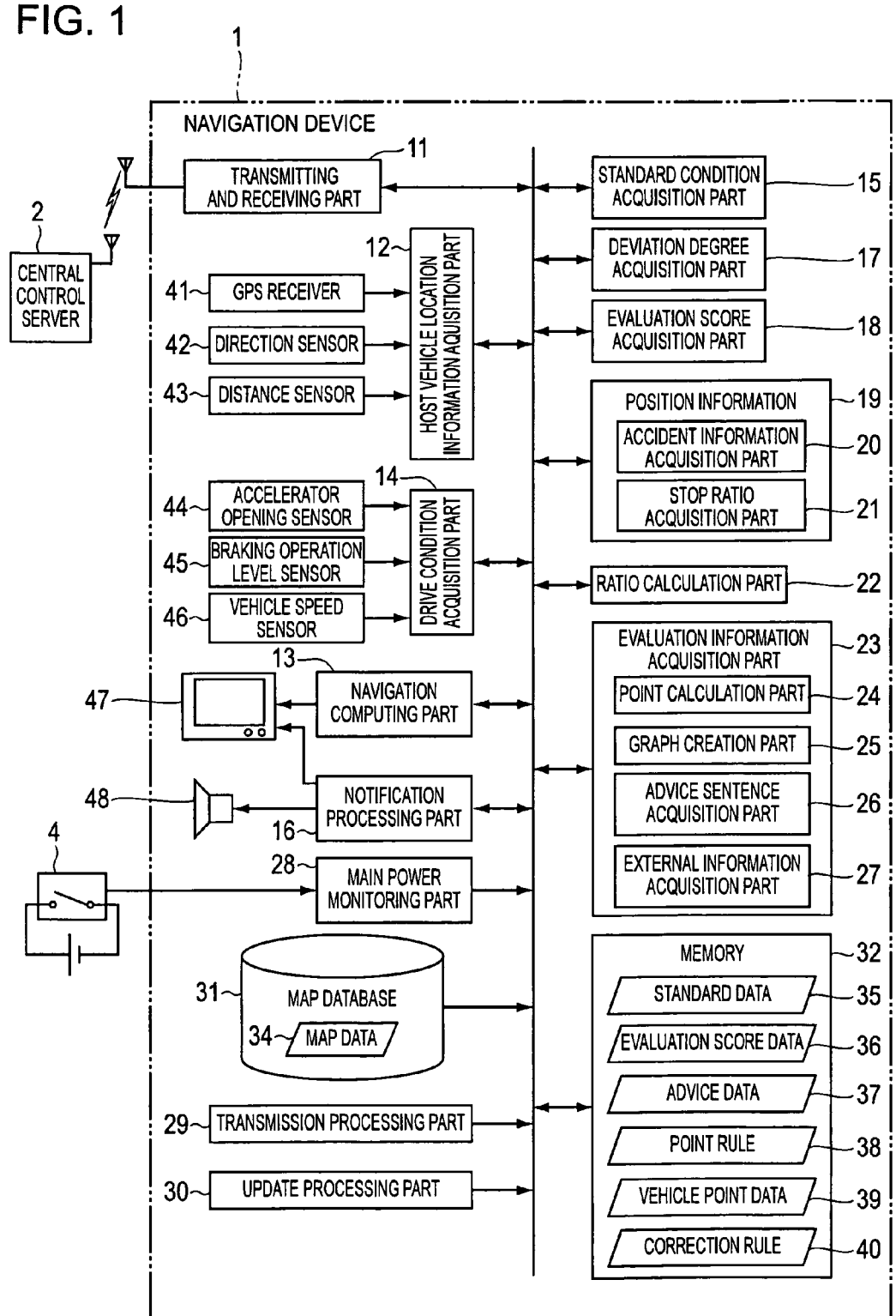
FIG. 1 is a block diagram showing a rough structure of a navigation device.

The first example of the present invention is described in conjunction with the accompanying drawings. Here, a case is explained as an example, in which a safe driving evaluation system includes an in-vehicle navigation device 1 and a central control server 2 installed communicable with a plurality of navigation devices 1. FIG. 1 is a block diagram showing a rough structure of the navigation device 1. The navigation device 1 comprising the safe driving evaluation system, if it is determined based on a current drive condition of a vehicle 3 at a predetermined location before a temporary stop position that there is a possibility of not being able to stop safely at the temporary stop position, executes a wake-up call to a driver, and acquires and outputs evaluation information 61 (refer to FIGS. 7 and 8) based on a ratio of the number of wake-up calls, which corresponds to the number of temporary stop positions where the wake-up call was executed, to the number of passed positions, which corresponds to the number of temporary stop positions where the vehicle 3 passed. The lower the ratio of the temporary stop positions where the wake-up call was executed is, the better evaluation the evaluation information 61 will have. This enables a driver of the vehicle 3 mounted with the navigation device 1 to be informed from the objective perspective to what extent the driver is practicing safe driving before the temporary stop position as a general trend, based on the evaluation information 61. Consequently, it becomes possible to raise the driver's awareness of the safe driving at the temporary stop position. In other words, it enables the driver to keep an intention high to practice appropriate driving for stopping the vehicle safely at the temporary stop position.

Figure 2:
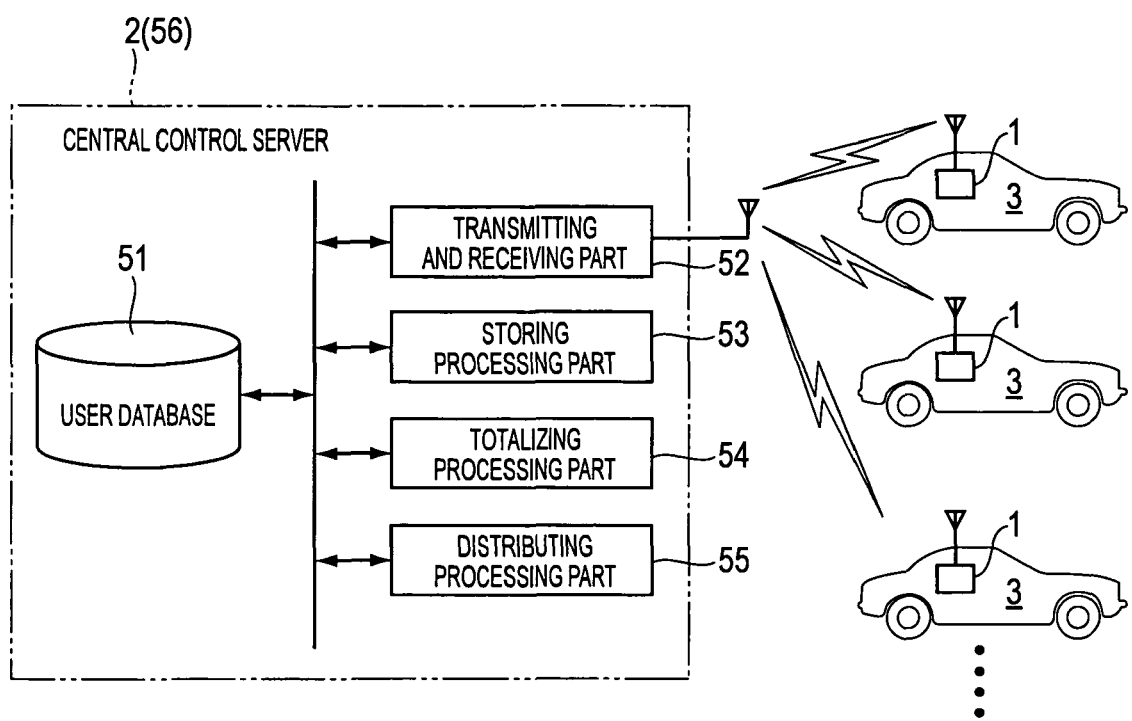
FIG. 2 is a block diagram showing a rough structure of a central control server.

FIG. 2 is a block diagram showing a rough structure of the central control server 2. The central control server 2 collects and totalizes information from a plurality of navigation devices 1 installed in each of a plurality of vehicles 3. Then, the central control server 2 generates the evaluation information 61 from the collected information and delivers such information to each of the navigation devices 1. According to the present example, the navigation device 1 corresponds to the in-vehicle terminal device, and the central control server 2 corresponds to the central control device and the information collection unit.

1. Navigation Device Structure

At first, the structure of the navigation device 1 is explained. Respective function parts of the navigation device 1 illustrated in FIG. 1, are functional portions for applying various kinds of processing to inputted data, which are mounted as hardware or software (program), or as hardware and software, in an arithmetic processing device such as a CPU as a core member, which is common or independent to the function parts. According to the present example, the navigation device 1 includes, as the function parts, a transmitting and receiving part 11, a host vehicle location information acquisition part 12, a navigation computing part 13, a drive condition acquisition part 14, a standard condition acquisition part 15, a notification processing part 16, a deviation degree acquisition part 17, an evaluation score acquisition part 18, a point information acquisition part 19, a ratio calculation part 22, an evaluation information acquisition part 23, a main power monitoring part 28, a transmission processing part 29, and an update processing part 30. The respective function parts are structured to be able to transmit and receive information each other via a communication line such as a digital transfer bus. Here, if the respective function parts are structured with software (program), the software is stored in a storage unit such as a RAM, a ROM, or the like that is capable of referring to the arithmetic processing device. Further, a map database 31 includes, as hardware configuration, a recording medium (the storage unit) such as, for example, a hard disk drive, a flash memory, a DVD drive including a DVD-ROM, or a CD drive including a CD-ROM. In addition, the memory 32 includes, as the hardware configuration, the recording medium capable of storing and rewriting information such as, for example, the hardware disk drive or the flash memory. If the memory 32 is structured with the recording medium capable of rewriting the map database 31, it may be installed in the recording medium common to the map database 31. Hereinafter, the structures of the respective parts of the navigation device 1 according to the present example will be described in detail.

1-1. Map Database

Figure 3:
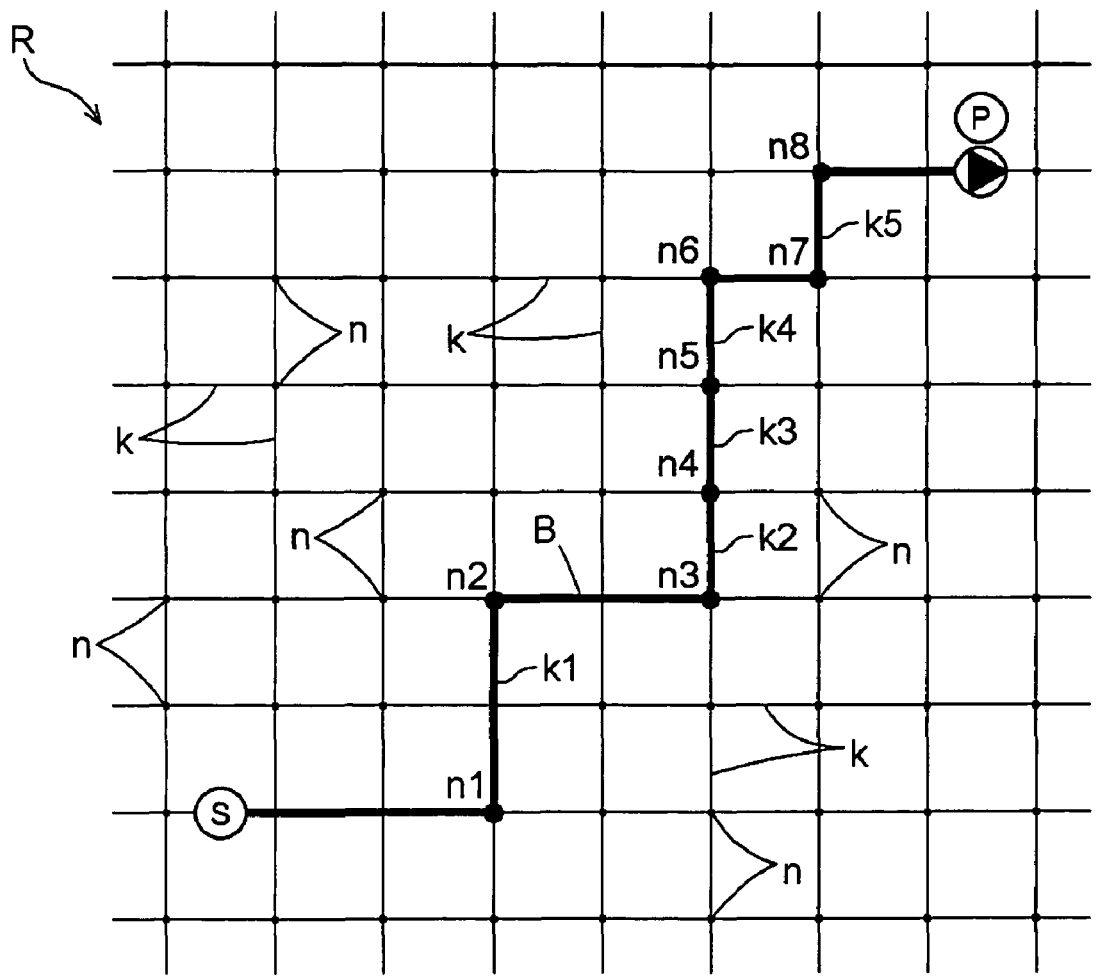
FIG. 3 shows an example of a structure of map information stored in a map database.

The map database 31 is a database storing map data 34, which is divided by rectangular area called a section that is separated by a predetermined longitude and latitude. The map data 34 includes, as illustrated in FIG. 3, for example, road network data R structured with a plurality of nodes n that correspond to a plurality of intersections and a plurality of links k that correspond to roads connecting the respective nodes n (intersections). FIG. 3 shows an example of the road network R, in which roads and intersections are allocated on a grid (an orthogonal reticular pattern). The respective nodes n include information of a location (a coordinate) on a map indicated by the longitude and the latitude. The respective links k, which are connected through the nodes n, include, as attribute information, information of a road type, an area type, a link length, a road width, shape interpolating points for presenting a link shape, and the like. In addition to the road network R, the map data 34 includes drawing information necessary for map display processing, various kinds of guidance information necessary for route guidance processing, and the like, which are performed by the navigation computing part 13. Here, the drawing information includes background information necessary for displaying road geometries, buildings, rivers, and the like, and letter information necessary for displaying names of cities, towns, and villages, names of roads, and the like. In addition, the map data 34 stored in the map database 31 further includes stop position information representing a position of a point where a temporary stop is required (hereinafter referred to as the "temporary stop position"). For example, such stop position information is stored as attribute information included in the link k corresponding to the temporary stop position (for example, information notifying that there is a stop requirement at one end of the link).

1-2. Transmitting and Receiving Part

The transmitting and receiving part 11 includes a communication device that transmits and receives data by radio communication with the central control server 2 via a radio base station or the like. As such radio communication method, for example, the known communication network such as cellular phone network or wireless LAN (Local Area Network) can be utilized. In the present example, the transmitting and receiving part 11, as described later, transmits information relating to a wake-up ratio to the central control server 2. In addition, the transmitting and receiving part 11 receives the evaluation information 61 obtained by a comparison with the other vehicles 3 such as order information 65, rank information 66, or the like (refer to FIGS. 7 and 8) from the central control server 2, and also receives update information for updating a correction rule 40, a point rule 38, advice data 37 that are stored in the memory 32. These are described later. In addition, the transmitting and receiving part 11 receives position information as information relating to each temporary stop position from the central control server 2. Here, the position information includes, for example, accident information as information of the number of accidents occurred in the past at each temporary stop position, stop ratio information as statistic information relating to a stop ratio representing a ratio that the vehicle actually conducts a temporary stop at each temporary stop position, and the like.

1-3. Host Vehicle Location Information Acquisition Part

The host vehicle location information acquisition part 12 functions as a host vehicle location information acquisition unit that acquires host vehicle location information representing a current location of a host vehicle. Here, the host vehicle location information acquisition part 12 is connected with a GPS receiver 41, a direction sensor 42, and a distance sensor 43. The GPS receiver 41 is a device that receives GPS signals from GPS (Global Positioning System) satellites. The GPS signals are received normally every second and outputted to the host vehicle location information acquisition part 12. In the host vehicle location information acquisition part 12, signals from the GPS satellites received by the GPS receiver 41 can be analyzed, and information of the current host vehicle location (coordinate), a travel direction, a movement speed, or the like can be acquired. The direction sensor 42 is a sensor that detects the travel direction of the host vehicle or a change in the travel direction. The direction sensor 42 includes, for example, a gyroscope, a geomagnetic sensor, and the like. And, the direction sensor 42 outputs the detection result to the host vehicle location information acquisition part 12. The distance sensor 43 is a sensor that detects the speed and the movement distance of the host vehicle. The distance sensor 43 includes, for example, a vehicle speed pulse sensor that outputs pulse signals each time a drive shaft or a wheel of the host vehicle, or the like rotates by a certain amount, a yaw/G sensor that detects acceleration of the host vehicle, a circuit that integrates the detected acceleration, and the like. The distance sensor 43 outputs information of the vehicle speed and the movement distance as the detection result to the host vehicle location information acquisition part 12.

The host vehicle location information acquisition part 12 performs computing for determining the host vehicle location in a known method based on the output from the GPS receiver 41, the direction sensor 42, and the distance sensor 43. In addition, the host vehicle location information acquisition part 12 also performs correction for matching the host vehicle location onto a road shown in the map data 34 through known map matching processing based on the map data 34 stored in the map database 31. A correction result of the host vehicle location information by such map matching processing is reflected into the host vehicle location information. In this manner, the host vehicle location information acquisition part 12 acquires the host vehicle location information including information of the current host vehicle location indicated by the coordinate (latitude and longitude) and the travel direction. The host vehicle location information acquired in the host vehicle location information acquisition part 12 is outputted to the navigation computing part 13.

1-4. Navigation Computing Part

The navigation computing part 13 is an arithmetic processing unit that operates according to an application program to execute navigation functions such as a host vehicle location display, a route calculation from a departure point to a destination, route guidance to the destination, destination search, or the like. For example, the navigation computing part 13 performs processing to acquire the map data 34 of the vicinity of the host vehicle from the map database 31, to display a map image on a display input device 47, and also to display a host vehicle location mark over the map image based on the host vehicle location information. In addition, the navigation computing part 13 provides route guidance using either or both of the display input device 47 and a voice output device 48 based on a route from the departure point to the destination calculated in a known method and the host vehicle location information. The display input device 47 outputs the evaluation information 61 inputted from the evaluation information acquisition part 23 (which is described in detail below). Further, the navigation computing part 13 is also connected with known various structures necessary as the navigation device 1 such as a user interface and the like. The user interface may be a remote controller, a touch panel integrally-mounted with the display input device 47, and the like.

1-5. Drive Condition Acquisition Part

The drive condition acquisition part 14 functions as a drive condition acquisition unit that acquires a drive condition of the vehicle. In the present example, the drive condition acquisition part 14 is connected with an accelerator opening sensor 44, a braking operation level sensor 45, and a vehicle speed sensor 46. Here, the accelerator opening sensor 44 is a sensor for detecting accelerator opening from a pressing level of an accelerator pedal. The accelerator opening is acquired as 0% in a case where the accelerator is completely closed, as 100% in a case where the accelerator is completely opened. The braking operation level sensor 45 is a sensor for detecting a braking operation level from a pressing level of a braking pedal. The vehicle speed sensor 46 is a sensor for detecting the vehicle speed. The vehicle speed sensor 46 detects the vehicle speed from a rotational speed of a drive shaft connected with a wheel of the vehicle, for example. The information relating to the braking operation level and the vehicle speed is outputted to the notification processing part 16 and utilized at the determination of whether or not to execute the wake-up call, which is described later. The information relating to the accelerator opening and the vehicle speed is outputted to the evaluation score acquisition part 18 and utilized for evaluation score acquisition processing.

1-6. Standard Condition Acquisition Part

The standard condition acquisition part 15 functions as a standard condition acquisition unit that acquires a standard drive condition representing a minimum required drive condition that should be fulfilled at the predetermined location in order to stop safely at the temporary stop position. Here, the predetermined location can be, for example, a second predetermined location (which is described in detail below) as a location at which the notification processing part 16 executes the wake-up call if a predetermined condition is met, or a location on the front side in relation to the travel direction of the vehicle (in the rearward direction of the vehicle) from the second predetermined location. In standard data 35 stored in the memory 32, a relation among a distance from the temporary stop position to the predetermined location, a standard vehicle speed, and a standard braking operation level is recorded. In the present example, the standard condition acquisition part 15 refers to the standard data 35 to acquire, as the standard drive condition, the standard vehicle speed as a minimum required vehicle speed and the standard braking operation level as a minimum required braking operation level that should be fulfilled at the predetermined location.

1-7. Notification Processing Part

The notification processing part 16 functions as a notification processing unit that performs, to the driver, guidance notifying that there is a temporary stop position ahead and the wake-up call if the predetermined condition is met. The notification processing part 16 performs processing that provides voice guidance notifying that there is a temporary stop position ahead via the voice output device 48, when the host vehicle has entered a first predetermined location located before the temporary stop position, based on the stop position information stored in the map database 31 and the host vehicle location information acquired by the host vehicle location information acquisition part 12. Here, the first predetermined location is a point on the front side in relation to the travel direction of the vehicle (in the rearward direction of the vehicle) by a distance (for example, 100 m, which can be changed as appropriate), which is long enough to stop the vehicle at the temporary stop position well in advance through an appropriate braking operation, from the temporary stop position as a reference. Such voice guidance is provided each time the host vehicle entered the first predetermined location located before the temporary stop position.

In addition, the notification processing part 16 performs processing that provides, to the driver, voice guidance of the wake-up call via the voice output device 48 if it is determined that there is a possibility of not being able to stop safely at the temporary stop position, based on a current drive condition of the vehicle acquired by the drive condition acquisition part 14, when the host vehicle entered the second predetermined location located before the temporary stop position. Here, the second predetermined location is located closer to the temporary stop position than the first predetermined location, and is a point on the front side in relation to the travel direction of the vehicle (in the rearward direction of the vehicle) by a distance (for example, 20 m, which can be changed as appropriate), which is a minimum distance required to stop the vehicle at the temporary stop position, from the temporary stop position as a reference. At this time, the notification processing part 16 compares the current drive condition of the vehicle acquired by the drive condition acquisition part 14 with the standard drive condition acquired by the standard condition acquisition part 15, to determine whether or not there is a possibility of not being able to stop safely at the temporary stop position. More specifically, for example, if the current vehicle speed is greater than the standard vehicle speed and the current braking operation level is smaller than the standard braking operation level, the notification processing part 16 determines that there is a possibility of not being able to stop safely at the temporary stop position. In this case, the notification processing part 16 provides the voice guidance of the wake-up call via the voice output device 48. On the other hand, if the current vehicle speed is equal to or smaller than the standard vehicle speed and the current braking operation level is equal to or greater than the standard braking operation level, the notification processing part 16 determines that the vehicle is able to stop safely at the temporary stop position. In this case, the voice guidance of the wake-up call is not executed. In addition, in performing the guidance or the wake-up call for the temporary stop position, it may provide the guidance by display of letters and icons or the like via the display input device 47, or provide both the guidance by the display of letters and icons or the like and the voice guidance. In the present example, the notification processing part 16 includes a determination unit and a wake-up call unit of this invention.

In addition, the notification processing part 16, in providing the guidance of the temporary stop position, may notify the accident information and the stop ratio information together as the position information relating to each temporary stop position. Such information is received from the central control server 2 via the transmitting and receiving part 11 and acquired by the position information acquisition part 19 including an accident information acquisition part 20 and a stop ratio acquisition part 21.

1-8. Deviation Degree Acquisition Part

The deviation degree acquisition part 17 functions as a deviation degree acquisition unit that acquires a deviation degree representing a degree of a deviation of the current drive condition of the vehicle to the standard drive condition.

In the present example, the deviation degree is acquired if the current drive condition of the vehicle does not meet the standard drive condition (the current drive condition is more unfavorable than the standard drive condition in terms of stopping safely at the temporary stop position). As described above, in the present example, the standard vehicle speed and the standard braking operation level are acquired as the standard drive condition. Therefore, the deviation degree acquired by the deviation degree acquisition part 17 relates to the vehicle speed and the braking operation level. For example, the deviation degree relating to the vehicle speed can be a ratio of a portion over the standard vehicle speed to the standard vehicle speed. The deviation degree relating to the braking operation level can be a ratio of a portion below the standard braking operation level to the standard braking operation level. In the present example, the deviation degree relating to the vehicle speed or the braking operation level, whichever is higher, is acquired as the deviation degree. Information relating to the deviation degree acquired in this manner is outputted to the ratio calculation part 22.

1-9. Evaluation Score Acquisition Part

Figure 4:
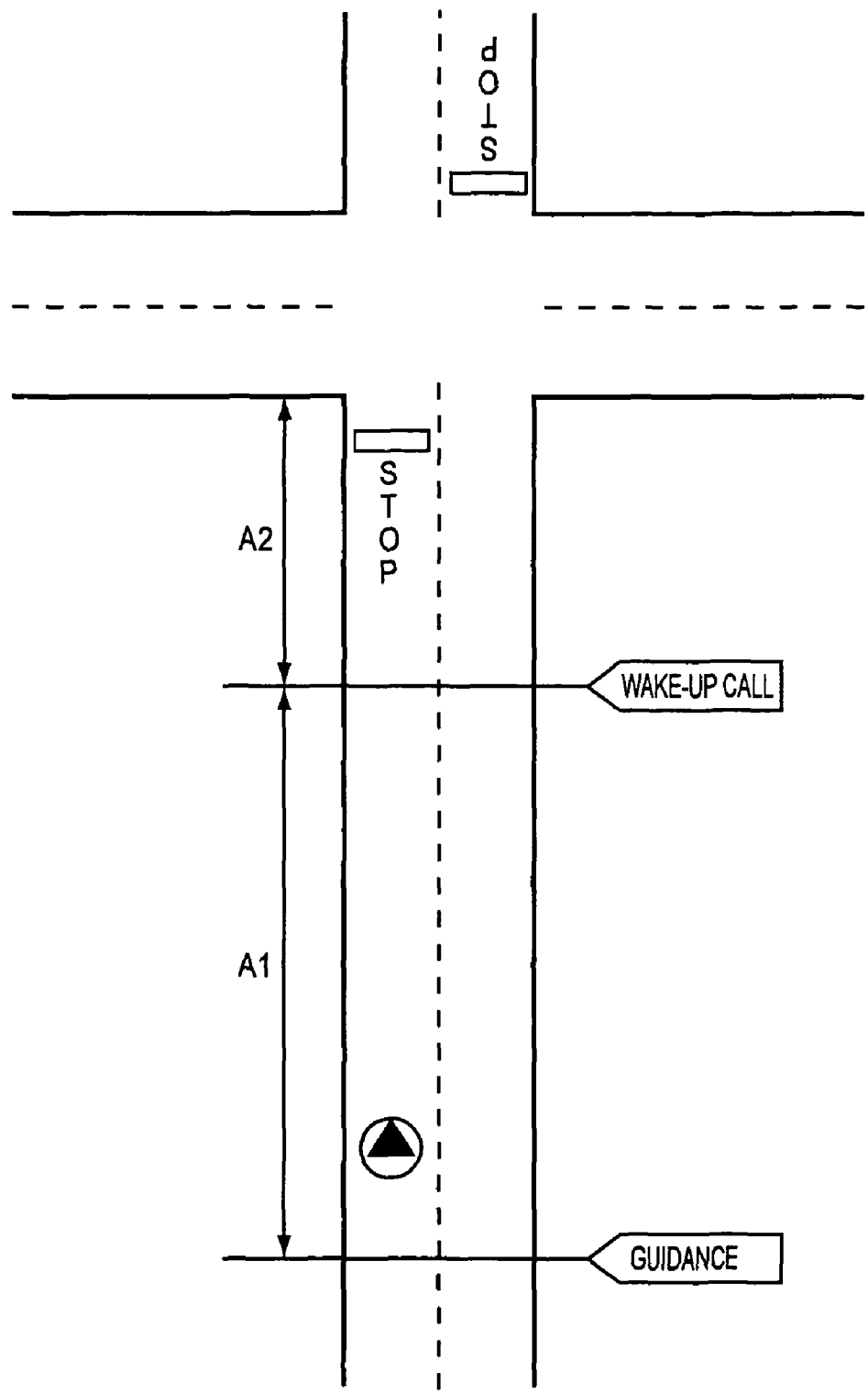
FIG. 4 shows a setting example of a plurality of areas according to a distance from a temporary stop position.

The evaluation score acquisition part 18 functions as an evaluation score acquisition unit that derives and acquires an evaluation score given by quantifying and evaluating a degree of safe driving for stopping safely at the temporary stop position. Here, the evaluation score acquisition part 18 derives and acquires the evaluation score if the host vehicle location is within a predetermined distance from the temporary stop position. At this time, the predetermined distance can be a distance (for example, 100 m) from the temporary stop position to the first predetermined location at which the voice guidance notifying that there is a temporary stop position ahead is provided. In the present example, as illustrated in FIG. 4, two areas of A1 (an area from the first predetermined location to the second predetermined location) and A2 (an area from the second predetermined location to the temporary stop position) are set between the temporary stop position and the first predetermined location, and the evaluation score acquisition part 18 derives and acquires the evaluation score given by quantifying and evaluating the degree of the safe driving, based on an accelerator opening change and a vehicle speed change as evaluation items relating to the drive operation of the vehicle, in each of the areas A1 and A2.

In the present example, a positive drive operation and a negative drive operation are set in advance for each evaluation item. Here, the positive drive operation is the drive operation that contributes to stop the vehicle safely at the temporary stop position. For example, an accelerator opening decrease is exemplified for the accelerator opening change, and a vehicle speed decrease is exemplified for the vehicle speed change. In a table of FIG. 5, the drive operation assigned with "+" corresponds to the positive drive operation.

The negative drive operation is the drive operation that inhibits to stop the vehicle safely at the temporary stop position. For example, an accelerator opening increase is exemplified for the accelerator opening change, and a vehicle speed increase is exemplified for the vehicle speed change. In the table of FIG. 5, the drive operation assigned with "−" corresponds to the negative drive operation.

In addition, the drive operation assigned with "0" is a neutral drive operation that does not contribute nor inhibit to stop the vehicle safely at the temporary stop position, and does not make any impact in deriving the evaluation score. For example, no change in both the accelerator opening and the vehicle speed is exemplified. Here, it is determined that there was no change if the change level in each evaluation item was within a predetermined range, and that there was a change such as an increase or a decrease if the change level exceeded a predetermined threshold value. For the accelerator opening, for example, it is determined that there was no change if an absolute value of the change level was equal to or less than 10%. On the other hand, it is determined that there was an accelerator opening increase or decrease if the absolute value of the change level exceeded 10%. For the vehicle speed, it is determined that there was no change if the absolute value of the change level was equal to or less than 5 km/h. On the other hand, it is determined that there was a vehicle speed increase or decrease if the absolute value of the change level exceeded 5 km/h. However, the numerical values of 10% and 5 km/h indicated here are merely examples and the numerical values can be changed as appropriate.

If it is determined that the positive drive operation was performed in the areas A1 and A2, a positive evaluation score that corresponds to such positive drive operation is added to a basic score (0 in the present example). If it is determined that the negative drive operation was performed in the areas A1 and A2, a negative evaluation score that corresponds to such negative drive operation is subtracted from the basic score. In deriving the evaluation score, the evaluation score acquisition part 18 refers to evaluation score data 36 stored in the memory 32. In FIG. 5, the evaluation score data 36, which is referred by the evaluation score acquisition part 18 in the present example, is illustrated as an example. As seen in FIG. 5, different evaluation scores (the positive evaluation score and the negative evaluation score) are set to the area A1 and the area A2 even for the same drive operation relating to the evaluation item. In the illustrated example, regarding the accelerator opening decrease that is the positive drive operation in the accelerator opening change, "10" is set as a basic evaluation score for the area A2 that is relatively close in distance to the temporary stop position. Then, "20," which is larger than "10," is set as the basic evaluation score for the area A1 that is relatively far in distance from the temporary stop position. The positive drive operation is the drive operation that contributes to stop the vehicle safely, therefore, it is predicted that such operation is naturally performed when the vehicle has approached the temporary stop position whereas such operation is not necessarily performed when the vehicle is at some distance from the temporary stop position. However, to stop more safely at the temporary stop position, it is effective to perform the positive drive operation as early as possible. Therefore, in order to highly evaluate such drive behavior, the longer the distance from the temporary stop position is, the greater the positive evaluation score toward the positive drive operation is set. Further, the same is applied to the positive evaluation score toward the positive drive operation relating to the vehicle speed change.

On the other hand, regarding the accelerator opening increase that is the negative drive operation in the accelerator opening change, "10" is set as the basic evaluation score for the area A1 that is relatively far in distance from the temporary stop position. Then, "20," which is larger than "10," is set as the basic evaluation score for the area A2 that is relatively close in distance to the temporary stop position. The negative drive operation is the drive operation that inhibits to stop the vehicle safely. When such operation is performed, if the vehicle is at some distance from the temporary stop position, it is not impossible to stop safely at the temporary stop position depending on the subsequent drive operation. Instead, when such operation is performed, if the vehicle is close to the temporary stop position, the vehicle may get into a very dangerous situation. Then, in order to warn against such drive behavior, the shorter the distance from the temporary stop position is, the greater the negative evaluation score toward the negative drive operation is set. Further, the same is applied to the negative evaluation score toward the negative drive operation relating to the vehicle speed. In this way, the evaluation score acquisition part 18 changes the evaluation score (the positive evaluation score and the negative evaluation score) to acquire toward the same drive operation relating to the evaluation item, according to the distance from the temporary stop position to the point where the drive operation relating to the evaluation item was performed.

Each time the drive operation relating to the evaluation item is detected in the areas A1 and A2, the evaluation score acquisition part 18 refers to the evaluation score data 36, acquires the evaluation score corresponding to such drive operation, and acquires the total scores as the evaluation score in passing the temporary stop position. Information relating to the evaluation score acquired in this manner is outputted to the ratio calculation part 22.

1-10. Ratio Calculation Part

The ratio calculation part 22 functions as a ratio calculation unit that calculates a wake-up call ratio as a ratio of the number of wake-up calls, which corresponds to the number of temporary stop positions where the wake-up call was executed, to the number of passed positions, which corresponds to the number of temporary stop positions where the vehicle 3 passed. Specifically, the ratio calculation part 22 calculates the wake-up call ratio according to the following formula (1).

$$\text{Wake-up call ratio}[\%] = (\text{Number of wake-up calls})/(\text{Number of passed positions}) \times 100 \quad (1)$$

The wake-up call ratio calculated in this manner represents a ratio of the temporary stop positions where there was a possibility of not being able to stop safely. In other words, when the wake-up call ratio is X [%], the ratio of (100−X) [%] represents a ratio of the temporary stop positions where the vehicle could stop well in advance and pass through safely. Consequently, the smaller the wake-up call ratio is, the more safely it is evaluated that the vehicle is driven.

When the vehicle 3 passed the temporary stop position during drive along a road, the ratio calculation part 22, according to the determination of whether or not to execute the wake-up call by the notification processing part 16, adds a predetermined counting number to either the number of the passed positions as a denominator, or the number of the wake-up calls as a numerator, or both, in the formula for calculation of the wake-up call ratio (1), and updates the wake-up call ratio. In the present example, the number of the passed positions as the denominator is the number of the temporary stop positions where the vehicle 3 passed. The number of the wake-up calls as the numerator is a corrected value that is given by correcting the number of the temporary stop positions where the wake-up call was executed according to a predetermined rule. To this end, if the notification processing part 16 executed the wake-up call, "1" as the counting number is added to the number of the passed positions as the denominator, and the counting number after the correction is added to the number of the wake-up calls as the numerator. The counting number after the correction is calculated by adding a correction counting number, which is described later, to "1" as a normal counting number. This allows the wake-up call ratio to be corrected. On the other hand, if the notification processing part 16 did not execute the wake-up call, "1" as the counting number is added only to the number of the passed positions as the denominator.

Figures 6A, 6B, 7:
FIGS. 6A and 6B show an example of a correction counting number to be used for a correction of the number of wake-up calls for calculating a wake-up call ratio.
FIG. 7 shows an example of a comprehensive evaluation screen for displaying evaluation information acquired by an evaluation information acquisition part.

As described above, the number of the wake-up calls as the numerator is the corrected value that is given by correcting the number of the temporary stop positions where the wake-up call was executed according to the predetermined rule. The counting number after the correction is added each time the wake-up call is executed at the temporary stop position. In the present example, the number of the wake-up calls is corrected according to the deviation degree and the evaluation score. FIGS. 6A and 6B show an example of the correction counting number to be used for the correction of the number of the wake-up calls for calculating the wake-up call ratio. FIG. 6A is a table showing a relation between the deviation degree and the correction counting number. FIG. 6B is a table showing a relation between the evaluation score and the correction counting number. These tables are stored in the memory 32 as the correction rule 40. When the wake-up call was executed by the notification processing part 16, the ratio calculation part 22, based on the deviation degree acquired by the deviation degree acquisition part 17 and the evaluation score acquired by the evaluation score acquisition part 18, refers to the correction rule 40 to correct the number of the wake-up calls as the numerator.

Here, the greater the deviation degree is, the greater the correction counting number is set. In the example shown in FIG. 6A, when the deviation degree is less than 10%, the correction counting number is set to "0." When the deviation degree is equal to or more than 10% and less than 20%, the correction counting number is set to "+0.1." When the deviation degree is equal to or more than 20%, the correction counting number is set to "+0.2." This setting realizes to increase the wake-up call ratio larger than usual in a case where the driver is practicing drive operation such that the degree of the deviation from the standard drive condition becomes large when passing through a temporary stop position. This is to inhibit such driving and to keep the driver's intention high to practice safe driving conforming to the standard drive condition.

In addition, the lower the evaluation score is, the greater the correction counting number is set. However, in the present example, the correction counting number is set only when the evaluation score is less than a predetermined value. In the example shown in FIG. 6B, when the evaluation score is less than −5, the correction counting number is set. When the evaluation score is equal to or more than −25 and less than −5, the correction counting number is set to "+0.1." When the evaluation score is less than −25, the correction counting number is set to "+0.2." This setting realizes to increase the wake-up call ratio larger than usual in a case where the driver is practicing drive operation such that the evaluation score becomes low when passing through a temporary stop position. This is to inhibit such driving and to keep the driver's intention high to practice safe driving that can derive a high evaluation score.

The correction rule 40 to be referred by the ratio calculation part 22 can be updated with the update information received from the central control server 2. This update processing is performed by the update processing part 30. That is, when the transmitting and receiving part 11 receives the update information for the correction rule 40 from the central control server 2, the update processing part 30 updates the correction rule 40 stored in the memory 32 based on the update information. This enables to change, when necessary, the rule such that the wake-up call ratio is a more appropriate value, based on a total point acquired so far (which is described later), a skill level and a driving experience of the driver, or the like, for example.

Next, on a basis of FIG. 3, a calculation of the wake-up call ratio by the ratio calculation part 22 is explained with reference to an example. Here, the vehicle 3 is defined to have driven along a route B indicated in a thick solid line from a departure S and have arrived at the current location P. In the route B, there are temporary stop positions at the upper ends in relation to FIG. 3 of links k1 to k5 (which correspond to locations of nodes n2, n4, n5, n6, and n8). Among them, at the temporary stop positions corresponding to the nodes n4 and n5, the wake-up call by the notification processing part 16 was executed. At the temporary stop positions corresponding to the nodes n2, n6, and n8, the wake-up call was not executed. At the temporary stop position corresponding to the node n4, "15%" and "−20 points" were acquired as the deviation degree and the evaluation score, respectively. At the temporary stop position corresponding to the node n5, "5%" and "−10 points" were acquired as the deviation degree and the evaluation score, respectively.

At first, at the temporary stop position corresponding to the node n2, the wake-up call was not executed; therefore, the ratio calculation part 22 adds "1" as the counting number only to the number of the passed positions as the denominator in the formula for calculation of the wake-up call ratio (1). Consequently, the wake-up call ratio just after passing the temporary stop position is calculated according to the following formula (2).

$$\text{Wake-up call ratio}[\%]=0/1\times100=0[\%] \quad (2)$$

Next, at the temporary stop position corresponding to the node n4, the wake-up call was executed; therefore, the ratio calculation part 22 adds "1" as the counting number to the number of the passed positions as the denominator to acquire "2," and also add the counting number after the correction to the number of the wake-up calls as the numerator in the formula for calculation for calculating the wake-up call ratio (1). The counting number after the correction is "1.2" that is a value acquired by adding the correction counting numbers based on the deviation degree "15%" and the evaluation score "−20 points" ("+0.1" and "+0.1," respectively) to the normal counting number "1." Thus, the ratio calculation part 22 adds "1.2" as the counting number after the correction to the number of the wake-up calls as the numerator to acquire "1.2." Consequently, the wake-up call ratio just after passing the temporary stop position is calculated according to the following formula (3).

$$\text{Wake-up call ratio}[\%]=1.2/2\times100=60[\%] \quad (3)$$

Next, at the temporary stop position corresponding to the node n5, the wake-up call was executed; therefore, the ratio calculation part 22 adds as the counting number to the number of the passed positions as the denominator to acquire "3," and also add the counting number after the correction to the number of the wake-up calls as the numerator in the formula for calculation for calculating the wake-up call ratio (1). The counting number after the correction is "1.1" that is a value acquired by adding the correction counting numbers based on the deviation degree "5%" and the evaluation score "−10 points" ("0" and "+0.1," respectively) to the normal counting number "1." Thus, the ratio calculation part 22 adds "1.1" as the counting number after the correction to the number of the wake-up calls as the numerator to acquire "2.3." Consequently, the wake-up call ratio just after passing the temporary stop position is calculated according to the following formula (4).

$$\text{Wake-up call ratio}[\%]=2.3/3\times100=77[\%] \quad (4)$$

At the temporary stop positions corresponding to the nodes n6 and n8, the same case as at the temporary stop position corresponding to the node n2 is applied; therefore, the explanation is omitted. The wake-up call ratio after passing the temporary stop position corresponding to the node n8 (the current location P) is calculated according to the following formula (5).

$$\text{Wake-up call ratio}[\%]=2.3/5\times100=46[\%] \quad (5)$$

1-11. Evaluation Information Acquisition Part

Figures 8, 9:
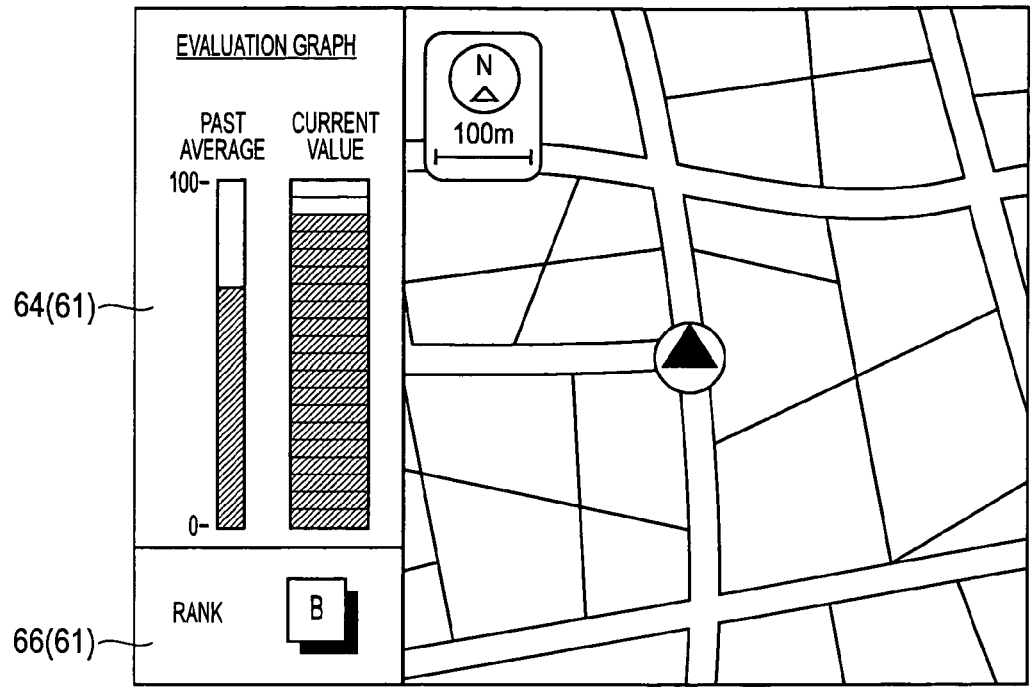
FIG. 8 shows an example of a guidance screen on which evaluation graph information for sequentially showing a change in the wake-up call ratio during drive is displayed.
FIG. 9 shows an example of the advice data stored in the memory.

The evaluation information acquisition part 23 functions as an evaluation information acquisition unit that acquires the evaluation information 61 based on the wake-up call ratio calculated by the ratio calculation part 22. Here, as illustrated in FIG. 1, the evaluation information acquisition part 23 includes a point calculation part 24, a graph creation part 25, an advice sentence acquisition part 26, and an external information acquisition part 27. And, the evaluation information acquisition part 23 acquires, as the evaluation information 61, point information 62, advice sentence information 63, evaluation graph information 64, the order information 65, and the rank information 66. In addition, the point rule 38 and the advice data 37 that are referred by the evaluation information acquisition part 23 are stored in the memory 32. FIGS. 7 and 8 show examples of screens in displaying the evaluation information 61 acquired by the evaluation information acquisition part 23 on the display input device 47. FIG. 7 shows an example of a comprehensive evaluation screen for displaying a result of a comprehensive evaluation regarding the prior wake-up call ratios. FIG. 8 shows an example of a guidance screen on which the evaluation graph information 64 for sequentially showing the change in the wake-up call ratio during drive of the vehicle 3 is displayed. In the example of FIG. 8, in addition to the evaluation graph information 64, the rank information 66 and a guidance map for route guidance are displayed.

The point calculation part 24 calculates a point to be assigned according to the wake-up call ratio. At this time, the point calculation part 24 refers to the point rule 38 stored in the memory 32 and performs a calculation of the point to be assigned according to the point rule 38. The point rule 38 is a rule that provides the relation between the wake-up call ratio calculated by the ratio calculation part 22 and the point to be assigned. In the present example, as an example, the rule provides that 1 point is assigned for each (100−X) [%] when the wake-up call ratio is X [%]. However, if the wake-up call ratio, which is calculated by the ratio calculation part 22 for each drive from on to off of the main power of the vehicle 3, exceeds 100[%] by the correction of the number of the wake-up calls for calculating the wake-up call ratio, 0 points are added (in other words, no point is added). Or, the rule may provide that 1 point is deducted for each (X−100) [%].

In addition, the point calculation part 24 accumulates the point of each drive calculated as above and calculates a total point acquired so far. The total point is acquired by accumulating and totalizing the points for each predetermined period, that is each year for example, and by newly accumulating the points from 0 at the beginning of another year. Or, the total point is an accumulated value of all points acquired so far. The point of each drive and the total point calculated by the point calculation part 24 are stored as vehicle point data 39 in the memory 32. And, the point calculation part 24 displays the point information 62 indicating the point acquired in previous drive (a previously-acquired point) and the total point on the display input device 47, based on the vehicle point data 39 stored in the memory 32. In the example of FIG. 7, such point information 62 is displayed on a part of the comprehensive evaluation screen.

The point rule 38 referred by the point calculation part 24 can be updated with the update information received from the central control server 2. The update processing is performed by the update processing part 30. That is, when the transmitting and receiving part 11 receives the update information for the point rule 38 from the central control server 2, the update processing part 30 updates the point rule 38 stored in the memory 32 based on the update information. This enables, for example, to change the rule such that the point to be assigned is a more appropriate value when necessary, to change the rule such that the point to be assigned is increased for a limited time, or the like. Further, the contents of the above point rule 38 are merely examples, and can be set as required. Consequently, for example, the point rule 38 is also preferably set such that the point to be assigned is changed according to the distance traveled by the vehicle 3 in one drive, even for the same wake-up call ratio.

The graph creation part 25 creates a graphic display visually showing at each moment the safe driving ratio that represents a ratio of the safe driving at the temporary stop position, the safe driving ratio that is derived based on the wake-up call ratio. The safe driving ratio [%] is derived as (100−X) [%] when the wake-up call ratio is X [%]. However, if the wake-up call ratio exceeds 100 [%] by the correction of the number of the wake-up calls for calculating the wake-up call ratio, the safe driving ratio is set to 0 [%]. Specifically, the graph creation part 25, as illustrated in FIG. 8, creates the evaluation graph information 64 for sequentially showing the change in the safe driving ratio during drive of the vehicle 3. In addition, the graph creation part 25 displays the created evaluation graph information 64 on the display input device 47. The evaluation graph information 64 includes a graph of the current value of the safe driving ratio and a graph of the past average value of the safe driving ratio. The graphs are closely placed in a condition comparable each other. Here, the graph of the current value of the safe driving ratio is a graph for sequentially updating and displaying the safe driving ratio on a route traveled from on of the main power to the present moment, along with the drive of the vehicle 3. The graph of the past average value of the safe driving ratio is a graph for displaying an average value of the past information relating to the safe driving ratio on a route traveled from on to off of the main power. And, the value is updated every drive of the vehicle 3. In the illustrated example, both of the graphs are bar graphs. As the past information of the safe driving ratio, information stored in the navigation device 1 or information stored in the central control server 2 for each of the vehicles 3 is utilized.

The advice sentence acquisition part 26 acquires the advice sentence information 63 having contents according to the wake-up call ratio. Here, the advice sentence acquisition part 26 reads and acquires the advice sentence information 63 having contents according to the wake-up call ratio from the advice data 37 stored in the memory 32. In addition, the advice sentence acquisition part 26 displays the acquired advice sentence information 63 on the display input device 47. The advice sentence information 63 is information of a sentence for notifying to the driver evaluation contents according to the wake-up call ratio. FIG. 9 shows an example of the advice data 37 stored in the memory 32. According to the example, when the wake-up call ratio is low as less than 20%, the sentence having the contents of praising the fact is acquired as the advice sentence information 63. When the wake-up call ratio is relatively low as equal to or more than 20% and less than 100%, the sentence having the contents of recommending to reduce the accelerator opening and to lower the vehicle speed is acquired as the advice sentence information 63. When the wake-up call ratio is equal to or more than 100[%], the sentence having the contents of strongly advising to reduce the accelerator opening and lower the vehicle speed is acquired as the advice sentence information 63. In the example illustrated in FIG. 7, the advice sentence information 63 is displayed on a part of the comprehensive evaluation screen.

The advice data 37 stored in the memory 32 can be updated with the update information received from the central control server 2. The update processing is performed by the update processing part 30. That is, when the transmitting and receiving part 11 receives the update information for the advice data 37 from the central control server 2, the update processing part 30 updates the advice data 37 stored in the memory 32 based on the update information. This enables to change, when necessary, the contents of the advice sentence information 63 to be more appropriate ones, for example, to change the contents of the advice sentence information 63 according to a drive operation pattern or the driving experience of the driver, or the like. Further, the contents of the above advice data 37 are merely examples, and can be set as required.

The external information acquisition part 27 performs processing for acquiring the evaluation information 61 from the central control server 2 installed outside the vehicle 3. More specifically, the external information acquisition part 27 performs communication with the central control server 2 via the transmitting and receiving part 11, and receives the evaluation information 61 obtained by a comparison with the other vehicles 3 such as the order information 65, the rank information 66, or the like. As described later, the central control server 2 is installed communicable with the navigation devices 1 mounted in a plurality of vehicles 3, and collects and totalizes the information relating to the wake-up call ratio from the plurality of the vehicles 3. In the present example, the central control server 2 collects and totalizes the point to be assigned according to the wake-up call ratio from the navigation device 1 of each of the vehicles 3 and the information of the number of the passed positions and the number of the wake-up calls after the correction, which are base information in calculating the wake-up call ratio, and creates the order information 65 and the rank information 66 as the totalizing result. The external information acquisition part 27 of each of the navigation devices 1 requests and acquires the order information 65 and the rank information 66 created in such way from the central control server 2 at a predetermined timing. In the present example, the external information acquisition part 27 requests the order information 65 and the rank information 66 from the central control server 2 when the main power of the vehicle 3 mounted with the navigation device 1 has been turned on.

The order information 65 is information indicating an order of each of the vehicles 3 regarding the wake-up call ratio obtained by a comparison with the other vehicles 3 and the safe driving ratio derived based on the wake-up call ratio. The order information 65 can be, for example, information such as the order of the average value of the wake-up call ratio of each of the vehicles 3 in a predetermined period, the order of the total of the points acquired by each of the vehicles 3 in the predetermined period, or the like. Here, as the predetermined period, various periods such as one year, one month, one week, or one day can be set for example. And, the external information acquisition part 27 displays the acquired order information 65 on the display input device 47. In the present example, as illustrated in FIG. 7, the order information 65 includes the order obtained by a comparison with other vehicles 3 in the total of the points acquired by each of the vehicles 3 every month and an arrow image showing whether the order has increased or decreased from the last month.

The rank information 66 is information indicating the rank to be assigned based on the past wake-up call ratio of each of the vehicles 3 obtained by a comparison with the other vehicles 3 and the safe driving ratio derived based on the wake-up call ratio. The rank information 66 can be information of the rank to which each of the vehicles belongs when the vehicles are divided into a plurality of ranks according to the order of the average value of the wake-up call ratio or the like of each of the vehicles 3 in the predetermined period, the order of the total of the points acquired by each of the vehicles 3 in the predetermined period, the total point acquired by each of the vehicles 3 so far, or the like. In the present example, the rank information 66 is determined by raising or lowering the present rank according to the order of the total of the points acquired in the predetermined period (for example, for 1 year). Here, as the rank, a division of A, B, C, . . . , a division of 1, 2, 3, . . . , or the like can be utilized. The external information acquisition part 27 displays the acquired rank information 66 on the display input device 47. In the present example, as illustrated in the example of FIG. 7, the rank information 66 utilizes the rank of A, B, C, . . . . The illustrated example shows that the vehicle 3 belongs to the rank "B."

1-12. Main Power Monitoring Part

The main power monitoring part 28 functions as a main power monitoring unit that monitors a state of the main power switch 4 of the vehicle 3. It is determined as a state of the main power-on that the main power switch 4 is tuned on and electricity is supplied to each part of the vehicle 3. Then, it is determined as a state of the main power-off that the main power switch 4 is tuned off and the electricity is not supplied to each part of the vehicle 3.

1-13. Transmission Processing Part

The transmission processing part 29 performs processing that transmits the information relating to the wake-up call ratio in the predetermined timing to the central control server 2. More specifically, the transmission processing part 29 performs processing that transmits the information relating to the wake-up ratio from on to off of the main power to the central control server 2 when the main power of the vehicle 3 mounted with the navigation device 1 has been tuned off. The on and off of the main power is determined by the main power monitoring part 28. In the present example, the transmission processing part 29 transmits to the central control server 2 the point information of each drive to be assigned according to the wake-up call ratio from on to off of the main power and the information of the number of the passed positions and the number of the wake-up calls after the correction, which are base information in calculating the wake-up call ratio.

2. Central Control Server Structure

Next, the structure of the central control server 2 is explained. As illustrated in FIG. 2, the central control server 2 is installed communicable with a plurality of the navigation devices 1 mounted in each of the vehicles 3. And, the central control server 2 collects and totalizes the information relating to the wake-up call ratio from each of the navigation devices 1, and creates the evaluation information 61 about each of the navigation devices 1 based on the totalized information. In addition, the central control server 2 distributes the created evaluation information 61 upon request from each of the navigation devices 1.

Respective function parts of the central control server 2 illustrated in FIG. 2 are functional portions for applying various kinds of processing to inputted data, which are mounted as hardware or software (program), or as hardware and software, in an arithmetic processing device such as a CPU as a core member, which is common or independent to the function parts. In the present example, the central control server 2 includes transmitting and receiving part 52, storing processing part 53, totalizing processing part 54, and distributing processing part 55 as the function parts. And, the respective function parts are structured to be able to transmit and receive information each other via a communication line such as a digital transfer bus. Here, if the respective function parts are structured with software (program), the software is stored in a storage unit such as a RAM, a ROM, or the like that is capable of referring to the arithmetic processing device. Further, a user database 51 includes, as the hardware configuration, the recording medium (the storage unit) that is capable of storing and rewriting information such as, for example, a hard disk drive, a flash memory, or the like. Hereinafter, the structures of the respective parts of the central control server 2 according to the present example will be described in detail.

2-1. Transmitting and Receiving Part

The transmitting and receiving part 52 includes a communication device that transmits and receives data by radio communication with the navigation devices 1 mounted in the plurality of the vehicles 3 via a radio base station or the like. As such radio communication method, the network common to the transmitting and receiving part 11 of the navigation device 1 is utilized. As indicated above, in the present example, the transmitting and receiving part 52 receives from the navigation device 1 the information relating to the wake-up ratio, more specifically, the point to be assigned according to the wake-up call ratio, and information of the number of the passed positions and the number of the wake-up calls after the correction, which are base information in calculating the wake-up call ratio. In addition, the transmitting and receiving part 52 transmits, to the navigation device 1, the evaluation information 61 obtained by a comparison with the other vehicles 3 such as the order information 65, the rank information 66, or the like, and the update information for updating the correction rule 40, the point rule 38, the advice data 37 that are stored in the memory 32 of the navigation device 1.

2-2. Storing Processing Part

The storing processing part 53 performs processing that stores the information relating to the wake-up call ratio received by the transmitting and receiving part 52 from the navigation device 1 mounted in each of the vehicles 3, by each of the vehicles 3 in the user database 51. As described above, in the present example, the information relating to the wake-up call ratio includes the information of the point to be assigned according to the wake-up call ratio, and the number of the passed positions and the number of the wake-up calls after the correction, which are base information in calculating the wake-up call ratio. Here, the information of the point to be assigned according to the wake-up call ratio is the point information of each drive to be assigned according to the wake-up call ratio from on to off of the main power. The information of the number of the passed positions and the number of the wake-up calls after the correction are information of the distance in each drive from on to off of the main power. Such information is transmitted from the navigation device 1 and received by transmitting and receiving part 52 as the information of each drive of each of the vehicles 3, when the main power has been turned off in the each of the vehicles 3. The storing processing part 53 stores in the user database 51 the received information relating to the wake-up call ratio that has been associated with identification information of each of the vehicles 3 and information of received time and date. Here, as the identification information of each of the vehicles 3, for example, an identification code of each of the vehicles 3 or each of the navigation devices 1, a license plate number of each of the vehicles 3, or the like can be utilized.

2-3. Totalizing Processing Part

The totalizing processing part 54 performs processing that totalizes the information relating to the wake-up call ratio of each of the vehicles 3 which is stored in the user database 51 and creates the evaluation information 61 relating to each of the vehicles 3 (each of the navigation devices 1). Specifically, the totalizing processing part 54 totalizes the information of the point of each drive received from each of the vehicles 3 for each predetermined period and creates the order information 65 representing the order of the total of the points obtained by a comparison with a plurality of the vehicles 3. In the present example, the totalizing processing part 54 computes the total of the points acquired by each of the vehicles 3 every month and creates the order information 65 representing the order obtained by a comparison with the other vehicles 3. Further, the totalizing processing part 54 totalizes the points acquired by each of the vehicles 3 in the predetermined period and creates the rank information 66 representing the rank to be assigned according to the totalizing result. In the present example, the totalizing processing part 54 determines, according to the order of the total of the points acquired in the predetermined period (for example, one year), the rank of each of the vehicles 3 by raising the rank if the order is high and lowering the rank if the order is low. The rank until the predetermined period firstly passes can be set arbitrarily such as to the lowest rank or an intermediate rank. The created order information 65 and rank information 66 are associated with the identification information of each of the vehicles 3 and stored in the user database 51.

In addition, the totalizing processing part 54 accumulates the information of the point of each drive received from each of the vehicles 3 and calculates the total point acquired so far. As described above, the total point is a value accumulated in each predetermined period or an accumulated value of all points acquired so far. The information of the calculated total point is associated with the identification information of each of the vehicles 3 and stored in the user database 51. The information of the total point stored in the user database 51 in such way is utilized for a backup and a confirmation of the information of the total point stored in the memory 32 of each of the navigation devices 1, or the like. Consequently, this information accords to the information of the total point stored in the memory 32 as vehicle point data 39 in the navigation device 1.

2-4. Distributing Processing Part

Upon request from the external information acquisition part 27 of each of the navigation devices 1, the distributing processing part 55 performs processing that reads from the user database 51 the order information 65 and the rank information 66 as the evaluation information 61, which is created by the totalizing processing part 54, and transmits the information to each of the navigation devices 1. In addition, the distributing processing part 55, when the update information for updating the point rule 38 and the advice data 37 is created by an update information creation part (not shown), performs processing that transmits the update information to the navigation devices 1.

3. Procedure Of Operation Processing

Figure 10:
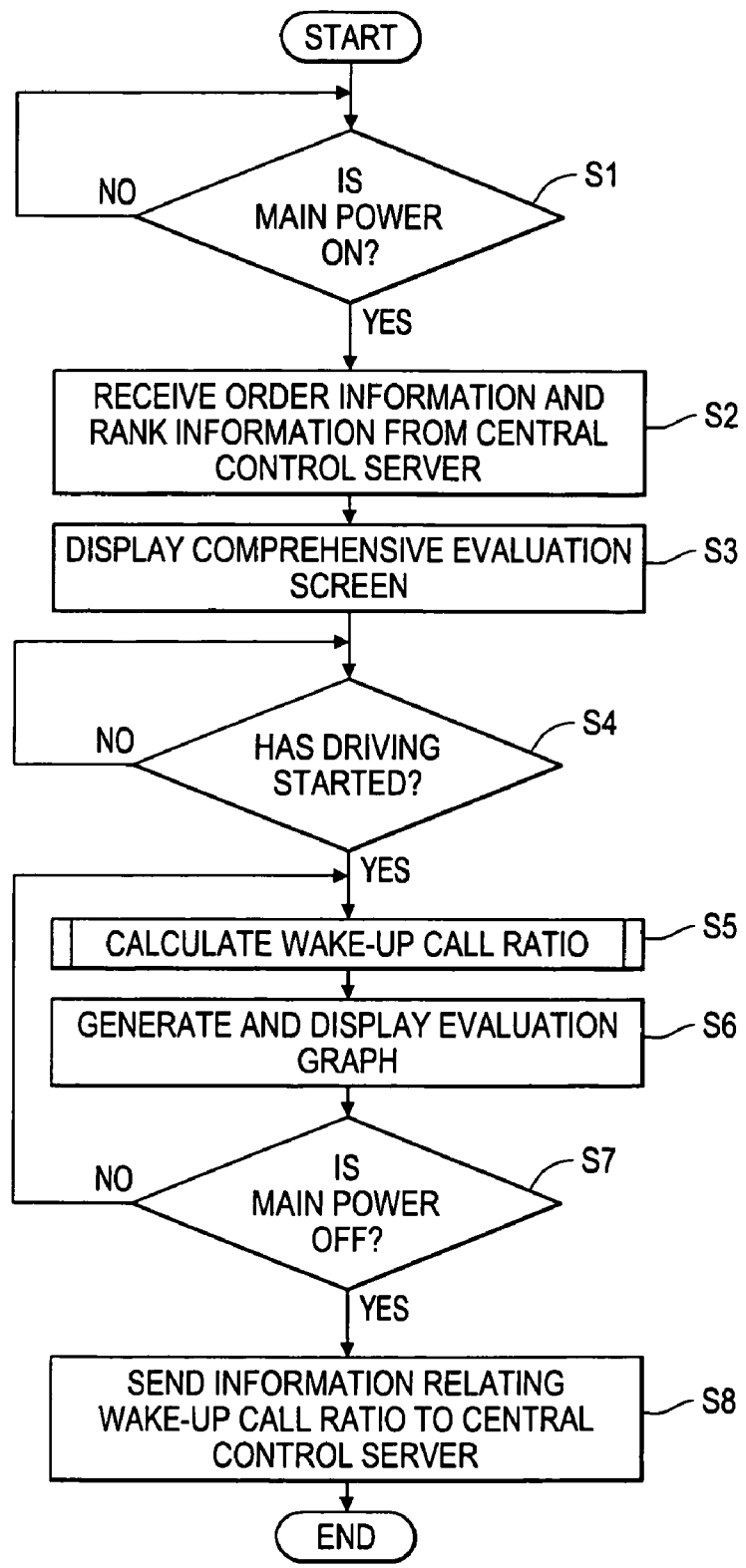
FIG. 10 is a flowchart showing an overall procedure of safe driving evaluation processing.
Figure 11:
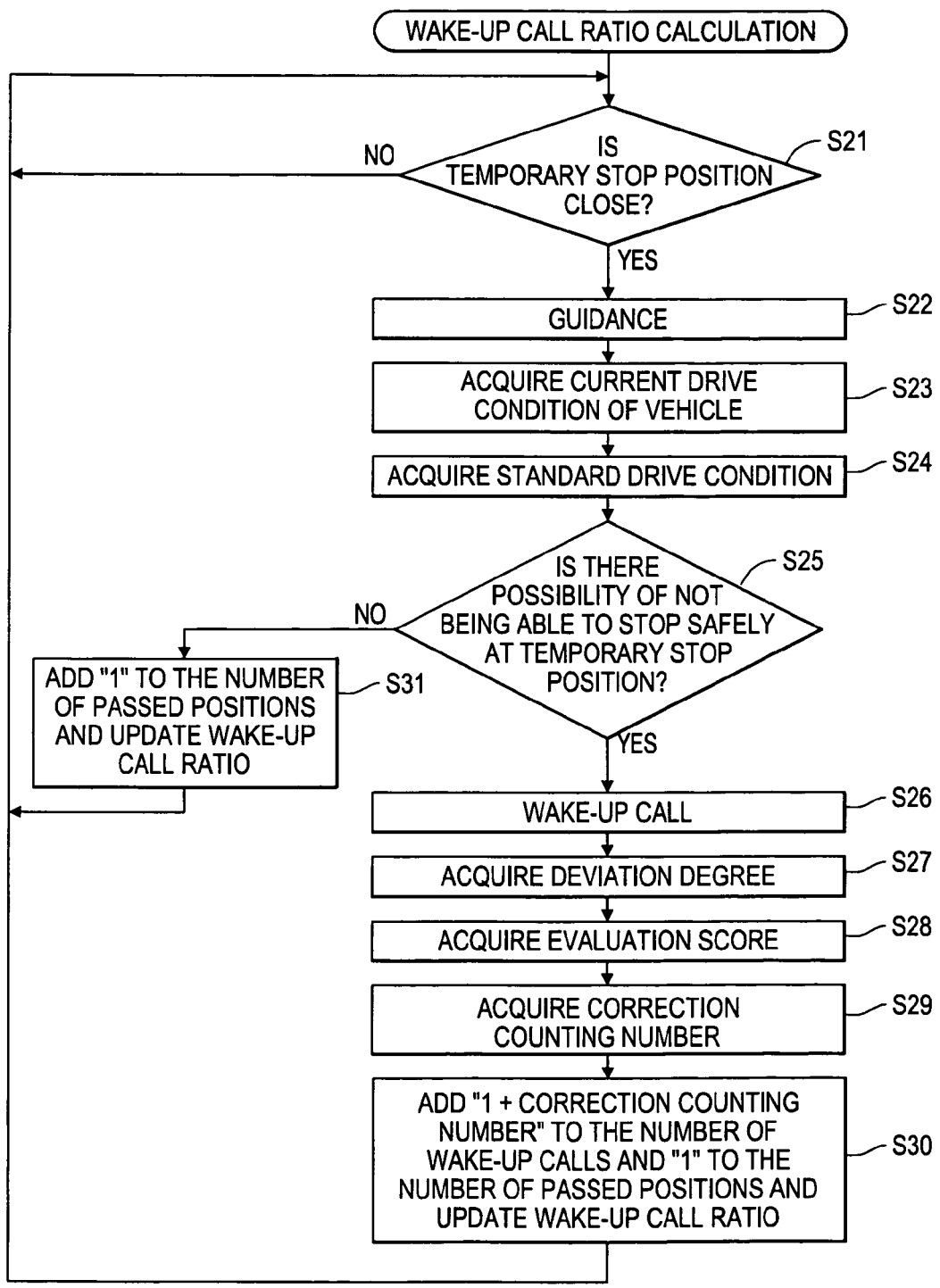
FIG. 11 is a flowchart showing a procedure of wake-up call ratio calculation processing.

Next, the procedure of safe driving evaluation processing (safe driving evaluation method) executed in the navigation device 1 according to the present example is explained. FIG. 10 is a flowchart showing an overall procedure of the safe driving evaluation processing according to the present example. FIG. 11 is a flowchart showing a procedure of wake-up call ratio calculation processing at step #05 in FIG. 10. The procedure is explained according to the flowcharts.

3-1. Overall Procedure of Safe Driving Evaluation Processing

At first, the overall procedure of the safe driving evaluation processing is explained. As illustrated in FIG. 10, when the main power switch 4 of the vehicle 3 mounted with the navigation device 1 has been turned on (Step #01: YES), the external information acquisition part 27 requests the order information 65 and the rank information 66 as the evaluation information 61 for the vehicle 3 from the central control server 2, receives such information (Step #02), and displays the comprehensive evaluation screen. The comprehensive evaluation screen, as illustrated in FIG. 7, includes display of the point information 62 indicating the point acquired in previous drive (a previously-acquired point) and the total point, the advice sentence information 63, the order information 65, and the rank information 66. Here, the point information 62 is calculated by the point calculation part 24 and acquired from the vehicle point data 39 stored in the memory 32. The advice sentence information 63 is acquired by the advice sentence acquisition part 26 reading the advice sentence information 63 having contents corresponding to the wake-up call ratio of the previous drive from the advice data 37 stored in the memory 32. The order information 65 and the rank information 66 are received from the central control server 2 at Step #2 and acquired. The comprehensive evaluation screen is structured with such information allocated according to a predetermined format.

When the vehicle 3 has started to travel (Step #04: YES), the ratio calculation part 22 performs processing that calculates the wake-up call ratio (Step #05). The wake-up call ratio calculation processing is explained in detail based on the flowchart of FIG. 11 later. Next, the graph creation part 25 creates and displays the evaluation graph information 64 (Step #6). The evaluation graph information 64, as illustrated in FIG. 8, is a graphic display visually showing the safe driving ratio that is derived based on the wake-up call ratio at each moment. The evaluation graph information 64 includes the graph of the current value of the safe driving ratio and the graph of the past average value of the safe driving ratio. The processing of Step #05 and Step #06 is executed repeatedly until the main power is turned off. Consequently, after the main power of the vehicle 3 has been turned on, the wake-up call ratio at each moment is calculated when necessary and also the evaluation graph information 64 representing the safe driving ratio at the each moment is displayed on the display input device 47 until the main power is turned off (Step #07: NO).

Then, when the main power has been turned off (Step #07: YES), the transmission processing part 29 transmits information relating to the wake-up call ratio from on to off of the main power to the central control server 2 (Step #08). Here, as described above, the information relating to the transmitted wake-up call ratio includes the point information of each drive and the information of the number of the passed positions and the number of the wake-up calls after the correction, which are base information in calculating the wake-up call ratio. Here, the point information of each drive is information of the point to be assigned according to the wake-up call ratio from on to off of the main power. In addition, the wake-up call ratio from on to off of the main power is equal to the wake-up call ratio calculated at Step #05 at the moment just before the main power was turned off. This is the end of the overall procedure of the safe driving evaluation processing.

3-2. Procedure of Wake-Up Call Ratio Calculation Processing

Next, the procedure of the wake-up call ratio calculation processing at Step #05 of FIG. 10 is explained. As illustrated in FIG. 11, when the vehicle 3 mounted with the navigation device 1 has approached the temporary stop position, i.e., when the vehicle 3 entered the first predetermined location (Step #21: YES), the notification processing part 16 provides the driver with guidance notifying that there is a temporary stop position ahead, via the voice output device 48 (Step #22). Next, the drive condition acquisition part 14 acquires the current drive condition of the vehicle (Step #23). And, the standard condition acquisition part 15 acquires the standard drive condition (Step #24). Next, the notification processing part 16 compares the current drive condition of the vehicle acquired at Step #23 with the standard drive condition acquired at Step #24 and determines whether or not there is a possibility of not being able to stop safely at the temporary stop position (Step #25). Then, if it has been determined that there is a possibility of not being able to stop safely at the temporary stop position (Step #25: YES), the notification processing part 16 provides voice guidance of the wake-up call via the voice output device 48 (Step #26).

Then, the deviation degree acquisition part 17 acquires the deviation degree based on the current drive condition of the vehicle acquired at Step #23 and the standard drive condition acquired at Step #24 (Step #27). Here, the deviation degree is acquired for both the vehicle speed and the braking operation level. The deviation degree acquisition part 17 acquires, as the deviation degree, whichever is higher between the deviation degrees of the vehicle speed and the braking operation level. Next, the evaluation score acquisition part 18 acquires the evaluation score of when passing the temporary stop position (Step #28). As described above, each time the drive operation relating to the evaluation item is detected in the areas A1 and A2, the evaluation score acquisition part 18 refers to the evaluation score data 36 and acquires the evaluation score corresponding to such drive operation. Therefore, the evaluation score acquisition part 18 acquires the total score as the evaluation score. Next, the ratio calculation part 22, based on the deviation degree acquired at Step #27 and the evaluation score acquired at Step #28, refers to the correction rule 40 stored in the memory 32 to acquire the correction counting number (Step #29). Then; the ratio calculation part 22 adds "1" as the counting number to the number of the passed positions as the denominator and "1+(correction counting number)" to the number of the wake-up calls as the numerator in the formula for calculation of the wake-up call ratio (1), and updates the wake-up call ratio (Step #30). On the other hand, if the notification processing part 16 has determined that the vehicle is able to stop safely at the temporary stop position (Step #25: NO), the ratio calculation part 22 adds "1" as the counting number only to the number of the passed positions as the denominator in the formula for calculation of the wake-up call ratio (1), and updates the wake-up call ratio (Step #31). Further, when the vehicle 3 passes the temporary stop position for the first time after the main power has been turned on, the wake-up call ratio is newly calculated at Step #30 or #31. After that, the procedure returns to Step #21. Then, each time the vehicle 3 travels and passes the temporary stop position, the wake-up call ratio is updated and the wake-up call ratio at each moment is calculated.

II. Second Example

Figure 12:
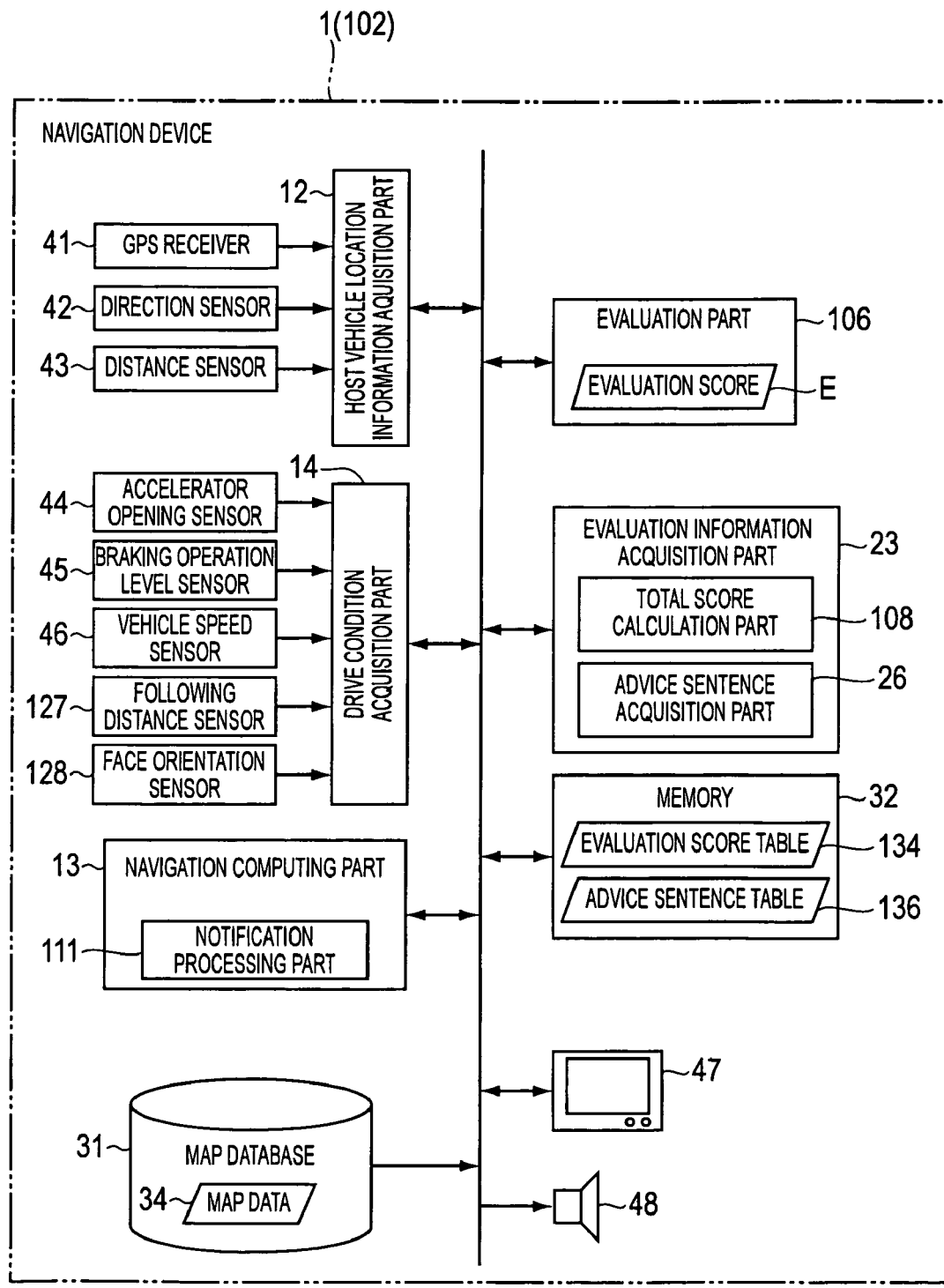
FIG. 12 is a block diagram showing a rough structure of the navigation device according to a second example.
Figure 14:
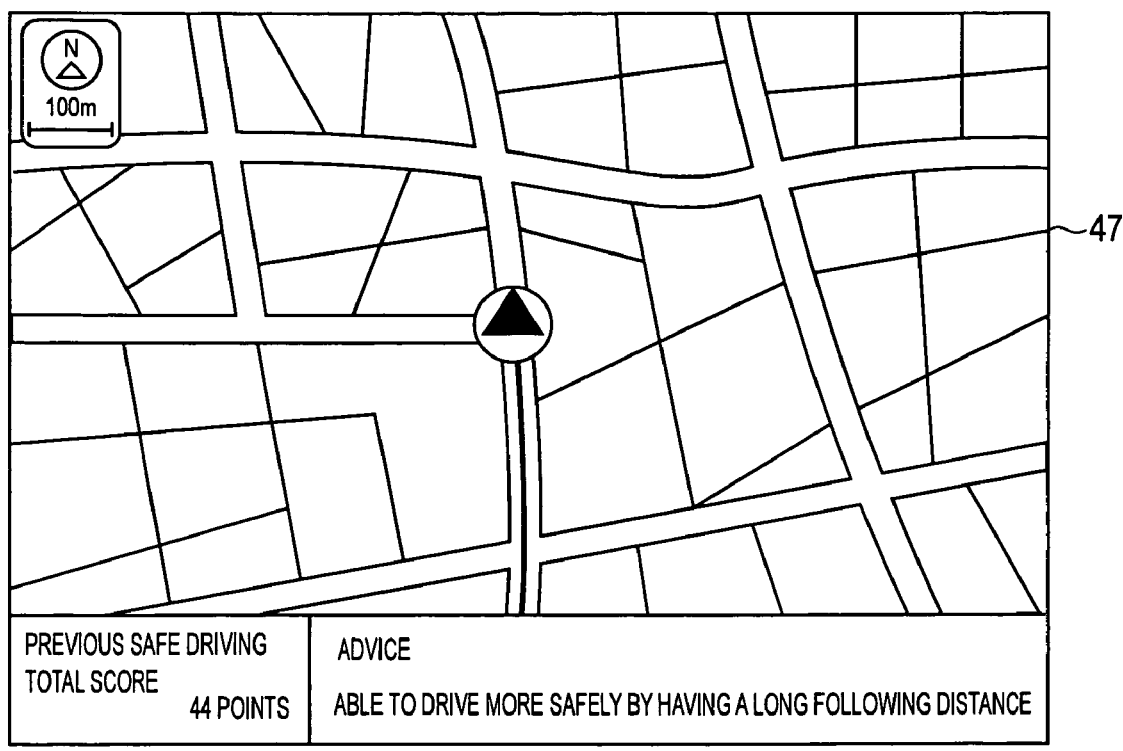
FIG. 14 shows an example of a display input device where the evaluation information according to the second example is outputted.

Next, the second example of the present invention is described in conjunction with the accompanying drawings. The safe driving evaluation system according to the present example largely differs from the first example in being structured only with the navigation device 1 as a safe driving evaluation device 102 without the central control server 2. Hereinafter, the navigation device 1 according to the present example is explained mainly in portions different from the first example. For those portions not explained, the configuration is the same as the first example. The safe driving evaluation device 102 according to the present example, if a location of a host vehicle is within a predetermined distance from a temporary stop position, evaluates a degree of the safe driving based on the evaluation item relating to the drive operation of the vehicle and outputs evaluation information based on such evaluation. The navigation device 1 performs normal navigation processing such as route guidance, and also notifies to a driver of the evaluation information according to contents of the evaluation by the safe driving evaluation device 102 when passing the temporary stop position. FIG. 12 is a block diagram showing a rough structure of the navigation device 1 according to the present example. FIG. 13 shows an example of an evaluation score table 134 stored in the memory 32. FIG. 14 shows an example of a display input device 47 where the evaluation information is outputted.

2-1. Memory

The memory 32 is the recording medium in which the evaluation score table 134 and an advice sentence table 136 are stored. The evaluation score table 134 is a table that provides assignment of evaluation scores toward various kinds of drive operations by a plurality of areas, which are set according to the distance from the temporary stop position. The advice sentence table 136 is a table that provides assignment of advice sentences to be notified toward the various kinds of drive operations. The evaluation score table 134 and the advice sentence table 136 are described in detail below.

2-2. Navigation Computing Part

The display input device 47 outputs total score information and advice information inputted from the evaluation information acquisition part 23 (which is described in detail below).

In addition, the navigation computing part 13 includes a notification processing part 111. The notification processing part 111 refers to the stop position information stored in the map database 31 and the host vehicle location information, and performs processing that provides voice guidance notifying that there is a temporary stop position ahead via the voice output device 48, when the host vehicle has entered a first predetermined location before the temporary stop position. Here, the first predetermined location is a point on the front side in relation to the travel direction of the vehicle (in the rearward direction of the vehicle) by a distance (for example, 100 m, which can be changed as appropriate), which is long enough to stop the vehicle at the temporary stop position well in advance through an appropriate braking operation, from the temporary stop position as a reference. Such voice guidance is provided each time the host vehicle entered the first predetermined location before the temporary stop position.

In addition, the notification processing part 111 performs processing that provides, to the driver, voice guidance of the wake-up call via the voice output device 48 if it is determined that there is a possibility of not being able to stop safely at the temporary stop position, based on the current drive condition of the vehicle acquired by the after-mentioned drive condition acquisition part 14, when the host vehicle entered a second predetermined location before the temporary stop position. Here, the second predetermined location is located closer to the temporary stop position than the first predetermined location, and is a point on the front side in relation to the travel direction of the vehicle (in the rearward direction of the vehicle) by a distance (for example, 20 m, which can be changed as appropriate), which is a minimum distance required to stop the vehicle at the temporary stop position, from the temporary stop position as a reference. For example, if braking operation is not performed even when the vehicle speed is over a certain speed, it is determined that there is a possibility of not being able to stop safely at the temporary stop position. Then, the wake-up call is executed. On the other hand, if it is determined that the vehicle is able to stop safely at the temporary stop position, the wake-up call is not executed. For example, if the braking operation is appropriately performed and the vehicle speed is reduced to under the certain speed, it is determined that the vehicle is able to stop safely at the temporary stop position. Then, the wake-up call is not executed. In addition, in performing the guidance or the wake-up call for the temporary stop position, the guidance may be provided by display of letters and icons or the like via the display input device 47, or both by the display of letters and icons or the like and by the voice guidance.

2-3. Drive Condition Acquisition Part

The drive condition acquisition part 14 is connected with an accelerator opening sensor 44, a braking operation level sensor 45, a vehicle speed sensor 46, a following distance sensor 127, and a face orientation sensor 128. The following distance sensor 127 is a sensor for detecting a following distance. For example, the following distance sensor 127 radiates laser or millimeter waves ahead of the vehicle and detects the following distance from a period of time from radiation of the laser or the like to reception of reflected waves that are reflected by a preceding vehicle. The face orientation sensor 128 is a sensor for detecting the face orientation of the driver. For example, the face orientation sensor 128 can judge the face orientation of the driver from information acquired by a CCD camera, an eye direction detection sensor, or the like, and determines whether or not the driver is looking ahead.

Consequently, in the present example, the drive condition acquisition part 14 acquires, as the drive condition of the vehicle, the accelerator opening, the braking operation level, the vehicle speed, the following distance, and the face orientation. The information relating to the braking operation level and the vehicle speed is outputted to the navigation computing part 13 and utilized at the determination of whether or not to execute the wake-up call notifying that there is a temporary stop position ahead. In addition, the accelerator opening, the vehicle speed, the following distance, and the face orientation correspond to the evaluation items for deriving the evaluation score E given by quantifying and evaluating the degree of the safe driving in the after-mentioned evaluation part 106. The information relating to the accelerator opening, the vehicle speed, the following distance, and the face orientation is outputted to the evaluation part 106 and utilized to derive the evaluation score E.

2-4. Evaluation Part

The evaluation part 106, when the host vehicle location is within a predetermined distance from the temporary stop position, functions as an evaluation unit that derives the evaluation score E given by quantifying and evaluating the degree of the safe driving based on the evaluation item relating to the drive operation of the vehicle. The evaluation part 106 derives the evaluation score E given by quantifying and evaluating the degree of the safe driving, based on one or more evaluation items relating to the drive operation of the vehicle, in each of the areas A1 and A2.

Here, the evaluation score E is derived based on the evaluation items including either or both of an accelerator opening change and a vehicle speed change. In addition, in the present example, a following distance change and a face orientation change are also the evaluation items. In the present example, a positive drive operation and a negative drive operation are set in advance for each evaluation item. Here, the positive drive operation is the drive operation that contributes to stop the vehicle safely at the temporary stop position. For example, an accelerator opening decrease is exemplified for the accelerator opening change, a vehicle speed decrease for the vehicle speed change, a following distance increase for the following distance change, and continuing looking front for the face orientation change. In a table of FIG. 13, the drive operations assigned with "+" correspond to the positive drive operation.

The negative drive operation is the drive operation that inhibits to stop the vehicle safely at the temporary stop position. For example, an accelerator opening increase is exemplified for the accelerator opening change, a vehicle speed increase for the vehicle speed change, a following distance decrease for the following distance change, and continuing looking away without facing front for the face orientation change. In a table of FIG. 13, the drive operations assigned with "−" correspond to the negative drive operation.

In addition, the drive operations assigned with "0" are a neutral drive operation that does not contribute nor inhibit to stop the vehicle safely at the temporary stop position. Such drive operations do not make any impact in deriving the evaluation score E. For example, no change for the accelerator opening change, the vehicle speed change, and the following distance change, and looking front by a notification for the face orientation change are exemplified. The notification here includes the voice guidance notifying that there is a temporary stop position ahead and the wake-up call by the navigation computing part 13.

More specifically, the evaluation part 106 constantly monitors the accelerator opening change, the vehicle speed change, the following distance change, and the face orientation change in each of the areas A1 and A2, acquires the change level in each area, and derives the evaluation score E toward each evaluation item based on such change level. At this time, it is determined that there was no change if the change level in each evaluation item was within the predetermined range, and that there was a change such as an increase or a decrease if the change level exceeded the predetermined threshold value. For the accelerator opening, for example, when the accelerator opening is acquired as 0% in a case where the accelerator is completely closed, as 100% in a case where the accelerator is completely opened, it is determined that there was no change if an absolute value of the change level was equal to or less than 10%. On the other hand, it is determined that there was an accelerator opening increase or decrease if the absolute value of the change level exceeded 10%. For the vehicle speed, it is determined that there was no change if the absolute value of the change level was equal to or less than 5 km/h. On the other hand, it is determined that there was a vehicle speed increase or decrease if the absolute value of the change level exceeded 5 km/h. However, the numerical values of 10% and 5 km/h indicated here are merely examples and the numerical values can be changed as appropriate. Each time the change such as exceeding the predetermined threshold value is detected, the evaluation part 106 derives the evaluation score E toward the drive operation relating to the evaluation item.

The accelerator opening change is derived from a difference between a current accelerator opening and an accelerator opening a unit time before based on output from the accelerator opening sensor 44. The vehicle speed change is derived from a difference between a current vehicle speed and a vehicle speed a unit time before based on output from the vehicle speed sensor 46. The following distance change is derived from a difference between a current following distance and a following distance a unit time before based on output from the following distance sensor 127. The face orientation change is derived from a difference between a current face orientation and a face orientation a unit time before based on output from the face orientation sensor 128. However, for the face orientation change, the face orientation itself is also target for the evaluation in addition to the change. That is, when the face orientation does not change, if the driver continues looking front, a positive evaluation score is given. If the driver continues looking away, a negative evaluation score is given.

The evaluation score E is derived by the positive evaluation score for the positive drive operation and the negative evaluation score for the negative drive operation. The positive evaluation score is a factor for adding scores in deriving the evaluation score whereas the negative evaluation score is a factor for subtracting scores in deriving the evaluation score. That is, if it is determined that the positive drive operation has been performed, the positive evaluation score for the positive drive operation is added. If it is determined that the negative drive operation has been performed, the negative evaluation score for the negative drive operation is subtracted. In deriving the evaluation score E, the evaluation part 106 refers to the evaluation score table 134 stored in the memory 32 based on the drive condition of the vehicle acquired by the drive condition acquisition part 14. FIG. 13 shows the evaluation score table 134 to be referred by the evaluation part 106 in the present example. As described above, in the present example, a plurality of the areas A1 and A2 are set between the temporary stop position and the first predetermined location, and the evaluation part 106 derives the evaluation score E given by quantifying and evaluating a degree of safe driving in each of the areas A1 and A2. In the illustrated evaluation score table 134, basic evaluation scores toward the drive operations (including the positive drive operation and the negative drive operation) for each evaluation item are set for each of the areas A1 and A2. Here, the basic evaluation score is a base for deriving the evaluation score E and included in a concept of the evaluation score E. In addition, the basic evaluation score includes the positive evaluation score and the negative evaluation score.

As seen in FIG. 13, different basic evaluation scores are set to the areas A1 and A2 even for the same drive operation relating to the evaluation item. In the illustrated example, regarding the accelerator opening decrease that is the positive drive operation in the accelerator opening change, "6" is set as the basic evaluation score for the area A2 that is relatively close in distance to the temporary stop position. Then, "15," which is larger than "6," is set as the basic evaluation score for the area A1 that is relatively far in distance from the temporary stop position. The positive drive operation is the drive operation that contributes to stop the vehicle safely, therefore, it is predicted that such operation is naturally performed when the vehicle has approached the temporary stop position whereas such operation is not necessarily performed when the vehicle is at some distance from the temporary stop position. However, to stop more safely at the temporary stop position, it is effective to perform the positive drive operation as early as possible. Therefore, in order to highly evaluate such drive behavior, the longer the distance from the temporary stop position is, the greater the positive evaluation score toward the positive drive operation is set. Further, the same is applied to the positive evaluation score toward the positive drive operation relating to the other evaluation items.

On the other hand, regarding the accelerator opening increase that is the negative drive operation in the accelerator opening change, "6" is set as the basic evaluation score for the area A1 that is relatively far in distance from the temporary stop position. Then, "15," which is larger than "6," is set as the basic evaluation score for the area A2 that is relatively close in distance to the temporary stop position. The negative drive operation is the drive operation that inhibits to stop the vehicle safely. When such operation is performed, if the vehicle is at some distance from the temporary stop position, it is not impossible to stop safely at the temporary stop position depending on the subsequent drive operation. Instead, when such operation is performed, if the vehicle is close to the temporary stop position, the vehicle may get into a very dangerous situation. Then, in order to warn against such drive behavior, the shorter the distance from the temporary stop position is, the greater the negative evaluation score toward the negative drive operation is set. Further, the same is applied to the negative evaluation score toward the negative drive operation relating to the other evaluation items. In this way, the evaluation part 106 changes the base evaluation score to give toward the same drive operation relating to the evaluation item, according to the operated distance.

As seen in FIG. 13, the positive evaluation score is set such that different values are acquired for the respective evaluation items even for the positive drive operation in the same area of A1 and A2. In the illustrated example, "+4" is set for continuing looking front in the area A1. Then, "+6," which is larger than "+4," is set for the following distance increase in the area A1. In addition, "+10," which is larger than "+4" and "+6," is set for the vehicle speed decrease in the area A1. "+15," which is larger than "+4," "+6," and "+10," is set for the accelerator opening decrease in the area A1. In various kinds of drive operations for stopping the vehicle safely, the level of importance for stopping the vehicle is different. For example, to stop the vehicle, it is normally very important to reduce the vehicle speed by decreasing the accelerator opening and increasing the braking operation level. On the other hand, it is preferable to keep the following distance to the preceding vehicle as long as possible, but not indispensable to increase the distance. In the same manner, regarding the face orientation of the driver, it is preferable to be looking front, however, it is not indispensable to continue looking front as long as the driver is confirming the front situation. Thus, in the evaluation score table illustrated in FIG. 13, the basic evaluation score for each drive operation is set to vary according to the level of importance for stopping the vehicle. The same is applied to the negative evaluation score.

Next, deriving the evaluation score E by the evaluation part 106 is explained with reference to an example. In the present example, drive operation condition of the vehicle relating to each evaluation item is acquired in the areas A1 and A2 shown in the example of FIG. 4. For example, in the area A1, the accelerator opening is decreased and the vehicle speed is reduced, the following distance to the preceding vehicle is maintained almost constant, and the driver continues looking front before and after guidance notification. In addition, the accelerator opening change and the vehicle speed change exceeding the predetermined threshold values are detected once for each item in the Area 1. In this case, the evaluation part 106 refers to the evaluation score table 134 of FIG. 13 (especially, the column of A1) to acquire the basic evaluation score according to the drive operation relating to each evaluation item. Specifically, "+15" for the accelerator opening change, "+10" for the vehicle speed change, "0" for the following distance change, "+4" for the face orientation change are acquired. Further, for example, in the area A2, the accelerator opening is decreased and the vehicle speed is reduced, the following distance to the preceding vehicle is increased, and the driver continues looking front before and after guidance notification. In addition, the accelerator opening change, the vehicle speed change, and the following distance change exceeding the predetermined threshold values are detected once for each item in the Area 2. In this case, the evaluation part 106 refers to the evaluation score table 134 of FIG. 13 (especially, the column of A2) to acquire the basic evaluation score according to the drive operation relating to each evaluation item. Specifically, "+6" for the accelerator opening change, "+4" for the vehicle speed change, "+3" for the following distance change, "+2" for the face orientation change are acquired.

The evaluation part 106 derives the evaluation score toward each drive operation based on the basic evaluation score for the drive operation relating to each evaluation item acquired in the area A1 and A2. That is, the evaluation part 106 derives the evaluation score E toward each drive operation by totalizing the basic evaluation score in the area A1 and the basic evaluation score in the area A2 for each drive operation. In the present example, "+21" for the accelerator opening change, "+14" for the vehicle speed change, "+3" for the following distance change, "+6" for the face orientation change are derived. And, the derived evaluation scores E are outputted to the evaluation information acquisition part 23.

2-5. Evaluation Information Acquisition Part

The evaluation information acquisition part 23 functions as an evaluation information acquisition unit that acquires the evaluation information based on the evaluation scores E. In the present example, the evaluation information acquisition part 23 acquires the total score information and the advice information as the evaluation information. Here, the total score information represents a total evaluation score acquired by totalizing the evaluation scores E for the respective evaluation items. The advice information represents a comment to the driver that corresponds to the evaluation scores E.

The total score information is calculated by a total score calculation part 108. In the present example, based on the evaluation scores E for the respective evaluation items, the total score calculation part 108 calculates the total evaluation score by totalizing the evaluation scores E. More specifically, the total score calculation part 108 calculates the total evaluation score by adding the positive evaluation score for each drive operation and subtracting the negative evaluation score for each drive operation toward a total basic score (for example, 0 points) for calculating the total evaluation score. In the above example, "+21," "+14," "+3," and "+6" are derived as the positive evaluation score for the accelerator opening change, the vehicle speed change, the following distance change, and the face orientation change, respectively. Therefore, by adding the scores to the total basic score, 44 points are calculated as the total score (in the present example, as the negative evaluation score is not derived, the score is not subtracted). In addition, the above total basic score can be changed as appropriate. The total basic score may be a previously-set fixed value other than 0 points, or an accumulative point of the total evaluation scores acquired in the past. If the accumulative point of the total evaluation scores is utilized as the total basic score, the accumulative point may be stored in the memory 32.

The advice information is acquired by an advice sentence acquisition part 26. In the present example, the advice sentence acquisition part 26 acquires a comment to the driver that corresponds to the evaluation scores E, based on the advice sentence table 136 recorded and stored in the memory 32. In the present example, the advice sentence acquisition part 26 refers to the evaluation scores E for the respective evaluation items toward the actually-performed drive operation and acquires a comment relating to the evaluation item having a relatively low evaluation score among the comments stored in the advice sentence table 136. In other words, the comment relating to the drive operation that mainly decreased the total evaluation score or caused an increase in the total evaluation score to be inhibited is acquired. In the above example, the increase in the total evaluation score was inhibited because the positive evaluation score was not acquired relating to the following distance change in the area A1 (the positive evaluation score "+6" was lost). Thus, a comment "Having a long following distance allows safe driving," that corresponds to a fact of having kept the following distance to the preceding vehicle almost constant, is acquired as the advice information. In this manner, acquiring a comment relating to the evaluation item having a relatively low evaluation score enables to notify the driver of an appropriate advice that may lead an improvement of the drive operation.

In addition, the advice sentence is set for each drive operation relating to the evaluation item in the advice sentence table 136. Therefore, in the present example, as illustrated in FIG. 13, the evaluation score table 134 and the advice sentence table 136 explained before are integrated and stored using each drive operation as a reference. The total score information and the advice information as the evaluation information acquired by the evaluation information acquisition part 23 are outputted to the display input device 47. Each time the vehicle passes through the temporary stop point, the evaluation information based on the evaluation score E in passing through such temporary stop point is displayed on the display input device 47.

FIG. 14 shows an example of the display input device 47 where the evaluation information is outputted. In the illustrated example, the total evaluation score based on the total score information and the comment to the driver based on the advice information are displayed at the lower area of the displayed screen of the display input device 47. In addition, the evaluation information may be outputted not only to the display input device 47 but also from the voice output device 48. That is, it is also possible that the total evaluation score and the comment to the driver are notified by audio from the voice output device 48 in addition to the display on the display input device 47 as illustrated in FIG. 14.

2-6. Procedure of Safe Driving Evaluation Processing

Figure 15:
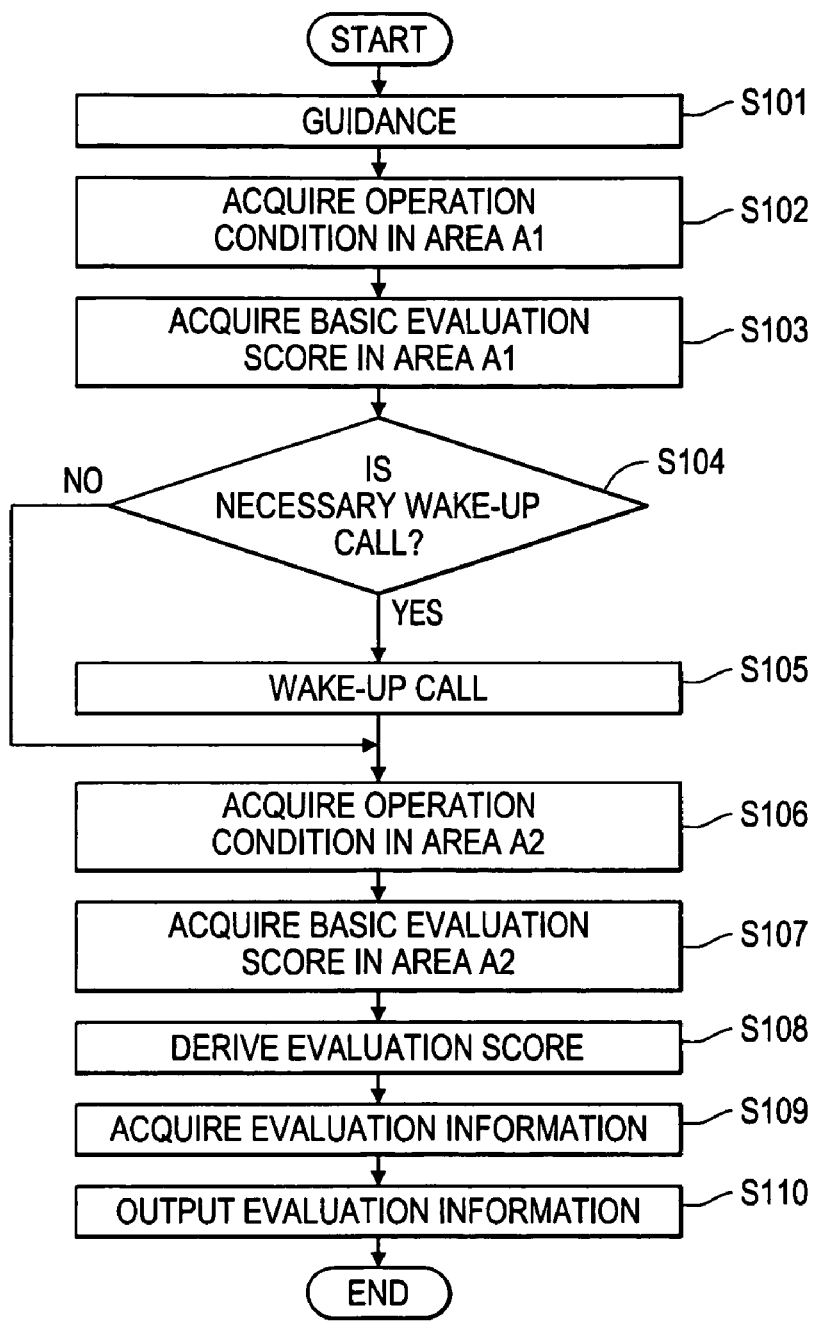
FIG. 15 is a flowchart showing processing order of safe driving evaluation program according to the second example.

Next, the procedure of the safe driving evaluation processing executed in the safe driving evaluation device 102, which is applied to the navigation device 1 according to the present example, is explained. FIG. 15 is a flowchart showing processing order of safe driving evaluation program according to the present example. The procedure of the safe driving evaluation processing explained below is executed by hardware or software (program), or hardware and software (program) including the respective function parts of the above safe driving evaluation device 102. If the program includes the respective functions of the safe driving evaluation device 102, the arithmetic processing device included in the safe driving evaluation device 102 operates as a computer that executes the safe driving evaluation program including the above respective function parts.

At first, when the vehicle entered the first predetermined location from the temporary stop position, the navigation computing part 13 provides the driver with guidance notifying that there is a temporary stop position ahead (Step #101). The drive condition acquisition part 14 acquires the drive condition of the vehicle in the area A1 that is an area relatively far from the temporary stop position (Step #102). The evaluation part 106 acquires the accelerator opening change, the vehicle speed change, the following distance change, and the face orientation change based on the drive condition of the vehicle acquired at Step #102, and acquires the basic evaluation score for each drive operation (Step #103). The notification processing part 111 determines whether or not it is necessary to execute the wake-up call to the driver, based on the current drive condition of the vehicle (Step #104). If it has been determined that it is necessary to execute the wake-up call (Step #104: YES), the notification processing part 111 performs the processing that provides the voice guidance of the wake-up call (Step #105). On the other hand, if it has been determined that it is not necessary to execute the wake-up call (Step #104: NO), the procedure goes to Step #106.

The drive condition acquisition part 14 acquires the drive condition of the vehicle in the area A2 that is an area relatively close to the temporary stop position (Step #106). The evaluation part 106 acquires the accelerator opening change, the vehicle speed change, the following distance change, and the face orientation change based on the drive condition of the vehicle acquired at Step #106, and acquires the basic evaluation score for each drive operation (Step #107). The evaluation part 106 derives the evaluation score E for each drive operation based on each base evaluation score acquired in the areas A1 and A2 (Step #108). The evaluation information acquisition part 23 acquires the evaluation information based on the evaluation scores E (Step #109). The acquired evaluation information is outputted to the display input device 47 and displayed on the display input device 47 (Step #110). This is the end of the safe driving evaluation processing.

III. Third Example

Figure 16:
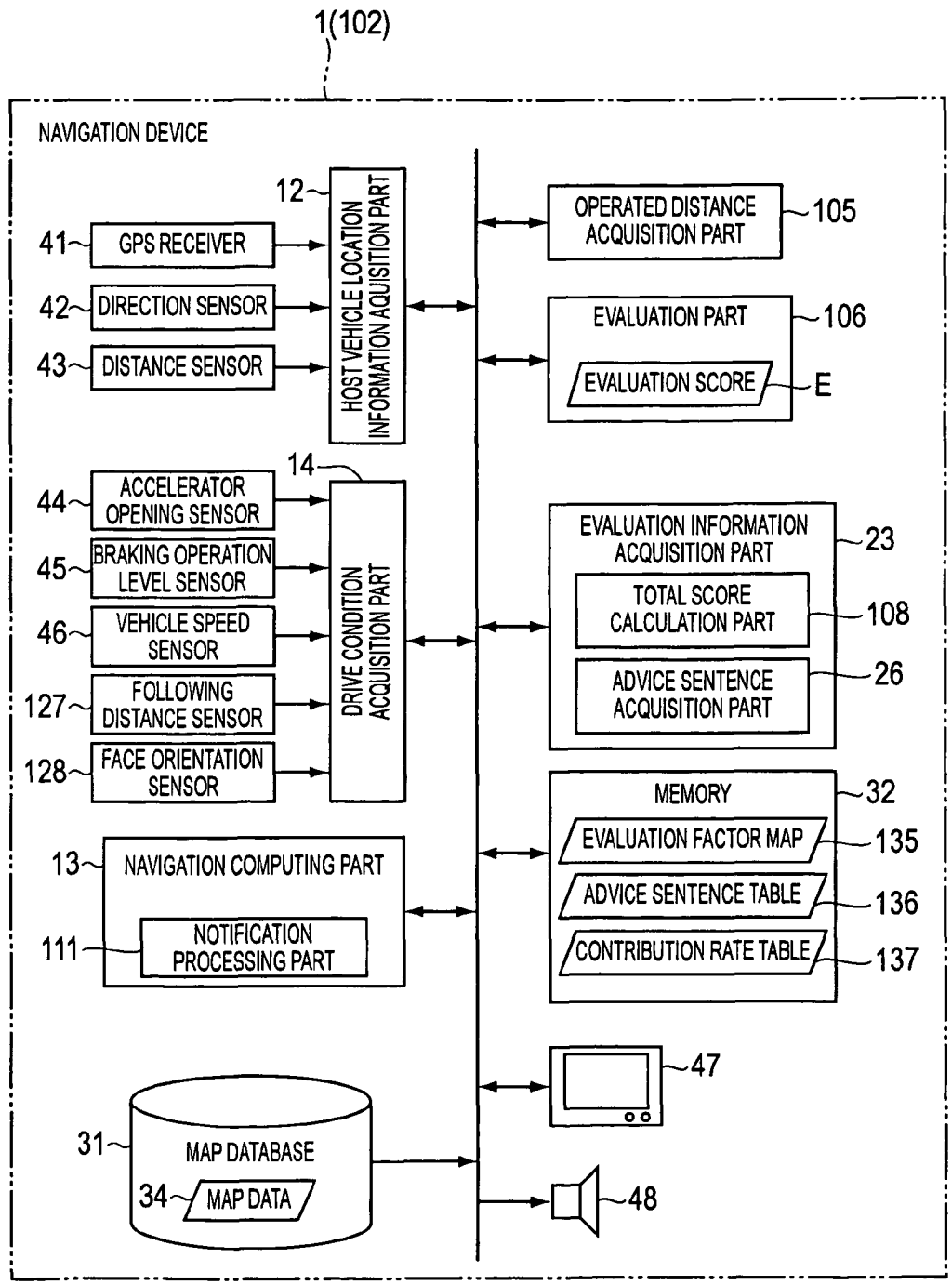
FIG. 16 is a block diagram showing a rough structure of the navigation device according to a third example.
Figures 17, 18:
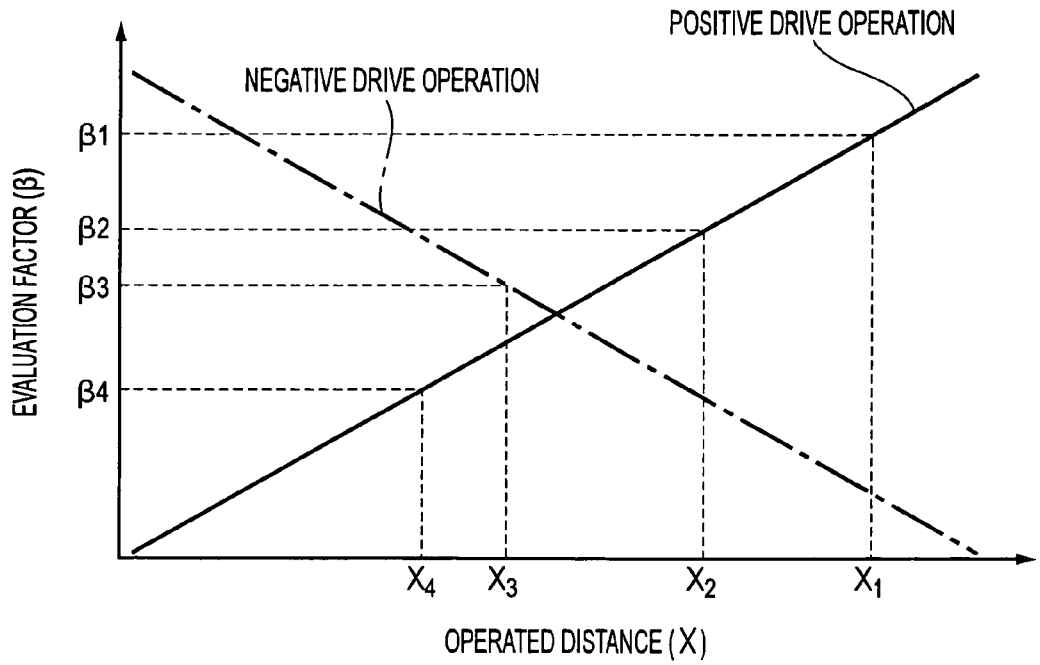
FIG. 17 shows an example of an evaluation factor map stored in the memory.
FIG. 18 shows an example of a contribution rate table stored in the memory.
Figure 19:
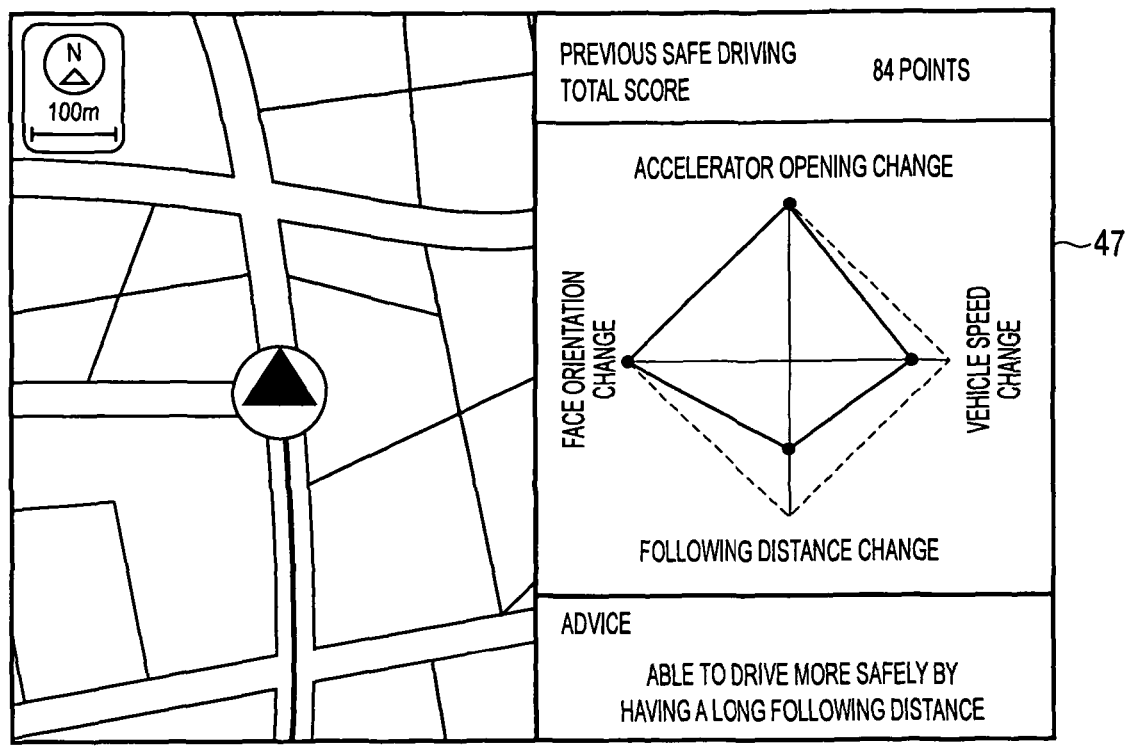
FIG. 19 shows an example of the display input device where the evaluation information according to the third example.

Next, the third example is described in conjunction with the accompanying drawings. The structure of the navigation device 1 including the safe driving evaluation device 102 according to the present example is basically almost the same as the structure of the navigation device 1 according to the first example, however, it is different from the navigation device 1 according to the second example in a point of including an operated distance acquisition part 105 and a derivation method of the evaluation score E by the evaluation part 106. Along with the difference, information recorded and stored in the memory 32 is partly different. In addition, the calculation method of the total evaluation score by the total score calculation part 108 of the evaluation information acquisition part 23 is also different. Hereinafter, the navigation device 1 according to the present example is explained mainly in portions different from the second example. For those portions not explained, the configuration is the same as the second example. FIG. 16 is a block diagram showing a rough structure of the navigation device 1 according to the present example. FIG. 17 shows an example of an evaluation factor map 135 stored in the memory 32. FIG. 18 shows an example of a contribution rate table 137 stored in the memory 32. FIG. 19 shows an example of the display input device 47 where the evaluation information is outputted.

3-1. Memory

The memory 32 is a recording medium storing the evaluation factor map 135, the advice sentence table 136, and the contribution rate table 137. The evaluation factor map 135 is a map that provides a relation between an operated distance and an evaluation factor (β) that is a base for deriving the evaluation score. The advice sentence table 136 is a table that provides assignment of the advice sentences to be notified toward the various kinds of drive operations. The contribution rate table 137 is a table that provides a contribution rate of the evaluation score E for each evaluation item to the total evaluation score, in calculating the total evaluation score. The evaluation factor map 135 and the contribution rate table 137 are described in detail later.

3-2. Operated Distance Acquisition Part

The operated distance acquisition part 105 functions as an operated distance acquisition unit that acquires the operated distance representing a distance from the temporary stop position to a point where the drive operation relating to the evaluation item has been performed. As described above, the map database 31 includes the stop position information. In addition, the host vehicle location information indicating the current location of the host vehicle is acquired by the host vehicle location information acquisition part 12. The operated distance acquisition part 105 acquires the operated distance based on the host vehicle location information at a point where the drive operation relating to the evaluation item has been operated and the temporary stop information. The operated distance acquired by the operated distance acquisition part 105 is outputted to the evaluation part 106.

3-3. Evaluation Part

The evaluation part 106, when the host vehicle location is within a predetermined distance from the temporary stop position, functions as an evaluation unit that derives the evaluation score E given by quantifying and evaluating the degree of the safe driving based on the evaluation item relating to the drive operation of the vehicle. Here, in the present example, a distance (for example, 100 m) from the temporary stop position to the first predetermined location at which the voice guidance notifying that there is a temporary stop position ahead is provided, is set as the predetermined distance. If the drive operation relating to the evaluation item, of which the change level exceeds a predetermined threshold value, is detected between the temporary stop position and the first predetermined location, the evaluation part 106, based on the operated distance acquired by the operated distance acquisition part 105, refers to the evaluation factor map 135 stored in the memory 32 to acquire the evaluation factor (β) according to the operated distance. And, the evaluation part 106 derives the evaluation score E as a multiplied value of the acquired evaluation factor (β) and a reference score set in advance. The reference score set in advance is a constant value. Therefore, the level of the evaluation factor (β) is directly linked with the level of the evaluation score E. The evaluation part 106 performs such processing each time the drive operation relating to the evaluation item is detected within the predetermined distance from the temporary stop position.

FIG. 17 roughly shows the evaluation factor map 135 referred by the evaluation part 106 in the present example as an example. As seen in FIG. 17, different values are set to be acquired as the evaluation factor (β) according to the operated distance. That is, for the positive drive operation, the longer the operated distanced is, the greater value is set as the evaluation factor (β). For the negative drive operation, the shorter the operated distance is, the greater value is set as the evaluation factor (β). In the illustrated example, the evaluation factor (β) changes in a linear manner (a linear function) according to the operated distance. As described above, the evaluation score E is derived as the multiplied value of the evaluation factor (β) and the reference score set in advance. Therefore, also in the present example, the longer the operated distance is, the greater value is set as the positive evaluation score. The shorter the operated distance is, the greater value is set as the negative evaluation score. Setting the relation between the operated distance and the evaluation factor (β) in this manner is to encourage a drive act such as performing a preventive operation for stopping safely in a stage as early as possible and to inhibit a drive act that may cause the driver to get into a very dangerous situation in the vicinity of the temporary stop position. In the present example, including such evaluation factor map 135 allows to derive the evaluation score E through appropriate weighting according to the operated distance even in a case where the drive operation relating to the evaluation item is detected in different locations.

Next, the derivation of the evaluation score E by the evaluation part 106 is explained with reference to an example. Here, an accelerator opening decrease, a vehicle speed reduction, a following distance decrease, and a following distance increase exceeding each predetermined threshold value have been identified at points that are located at x1 to x4 from the temporary stop position. In this case, the evaluation part 106 refers to the evaluation factor map 135 of FIG. 17 to acquire the evaluation factors ($\beta1$, $\beta2$, $\beta3$, and $\beta4$, respectively) according to the distance from the respective points to the temporary stop position (the operated distance). However, $\beta1$, $\beta2$, and $\beta4$ are the evaluation factors toward the positive drive operation and $\beta3$ is the evaluation factor toward the negative drive operation. Here, when the reference score set in advance is B, $\beta1 \cdot B$ is derived as the positive evaluation score toward the accelerator opening change at a point that is located at x1 from the temporary stop position. $\beta2 \cdot B$ is derived as the positive evaluation score toward the vehicle speed change at a point that is located at x2 from the temporary stop position. $\beta4 \cdot B$ is derived as the positive evaluation score toward the following distance change at a point that is located at x4 from the temporary stop position. $\beta3 \cdot B$ is derived as the negative evaluation score toward the following distance change at a point that is located at x3 from the temporary stop position.

3-4. Evaluation Information Acquisition Part

The evaluation information acquisition part 23 functions as the evaluation information acquisition unit that acquires the evaluation information based on the evaluation score E. The evaluation information acquisition part 23 according to the present example calculates for each evaluation item a multiplied value of the evaluation score E for each evaluation item and the contribution rate ($\alpha$) set toward such evaluation item. FIG. 18 roughly shows the contribution rate table 137 referred by the evaluation part 106 according to the present example as an example. As illustrated in FIG. 18, a contribution rate ($\alpha$) is set for each evaluation item. Here, when the contribution rate for the accelerator opening change is $\alpha A$, the contribution rate for the vehicle speed change is $\alpha B$, the contribution rate for the following distance change is $\alpha C$, the contribution rate for the face orientation change is $\alpha D$, the contribution rates are set as $\alpha A > \alpha B > \alpha C > \alpha D$ according to the importance level for stopping the vehicle safely in the present example. That is, the contribution rates for the accelerator opening decrease, the braking operation level increase, and the vehicle speed decrease accompanied by the accelerator opening decrease and the braking operation level increase, which are highly important for stopping the vehicle safely, are set high. And, the contribution rates for the following distance change and the face orientation change as the drive operations, which are not necessarily fulfilled, are set low.

The total score calculation part 108 totalizes the respective multiplied values of the evaluation score E for each evaluation item and the contribution rate ($\alpha$) set toward such evaluation item calculated by the evaluation information acquisition part 23. At this time, the formula (6) for calculating the total evaluation score in the above example is as follows.

$$\text{Total evaluation score} = C + \alpha A \cdot \beta 1 \cdot B + \alpha B \cdot \beta 2 \cdot B - \alpha C \cdot \beta 3 \cdot B + \alpha C \cdot \beta 4 \cdot B \quad (6)$$

Here, C represents the total basic score for calculating the total evaluation score. The total evaluation score as the evaluation information calculated in this way is outputted to the display input device 47. In addition, in the present example, individual score information representing the evaluation score E for each evaluation item is also outputted directly to the display input device 47 as the evaluation information. Then, each time the vehicle passes through the temporary stop position, the evaluation information based on the evaluation score E in passing the temporary stop position is displayed on the display input device 47. FIG. 19 shows an example of the display input device 47 where the evaluation information is outputted. In the illustrated example, the total evaluation score based on the total score information, a chart visually showing the evaluation for each evaluation item based on the individual score information, and the comment to the driver based on the advice information are displayed at the right half area of the displayed screen of the display input device 47.

IV. Other Examples (1) In the above first example, a case was explained as an example, in which the ratio calculation part 22, in calculating the wake-up call ratio, corrects the number of the wake-up calls for calculating the wake-up call ratio according to the deviation degree acquired by the deviation degree acquisition part 17 and the evaluation score acquired by the evaluation score acquisition part 18, for each of the temporary stop positions where the wake-up call was executed. However, it is also a preferable that "1" is equally added to the number of the passed positions as the denominator and the number of the wake-up calls as the numerator in the formula for calculation of the wake-up call ratio (1) irrespective of the deviation degree and the evaluation degree, when the wake-up call was executed.

In addition, it is also possible that the number of the wake-up calls for calculating the wake-up call ratio is corrected according to, in addition to the deviation degree and the evaluation score, the information of the number of accidents occurred in the past at each temporary stop position that is acquired by the accident information acquisition part 20, the stop ratio information as statistic information relating to a stop ratio representing a ratio that the vehicle actually conducts a temporary stop at each temporary stop position acquired by the stop ratio acquisition part 21, and the like. More specifically, it is preferable to correct the number of the wake-up calls for calculating the wake-up call ratio to become larger at the temporary stop positions where a larger number of accidents were occurred in the past, if the wake-up call was executed at such positions. This enables the driver to keep an intention high to practice safe driving with greater care at the temporary stop positions with a large number of accidents. In addition, it is preferable to correct the number of the wake-up calls for calculating the wake-up call ratio to become larger at the temporary stop positions where the stop ratio of the other vehicles is higher, if the wake-up call was executed at such positions. This enables the driver to keep an intention high to practice safe driving at temporary stop positions with a high stop ratio.

(2) In the above first example, a case was explained as an example, in which, in calculating the wake-up call ratio when the wake-up call was executed, the wake-up call ratio is corrected by utilizing the number of the temporary stop positions where the vehicle 3 passed as the number of the passed positions as the denominator and the corrected value, that is given by correcting the number of the temporary stop positions where the wake-up call was executed according to a predetermined rule, as the number of the wake-up calls as the numerator. However, it is also possible that the wake-up call ratio is calculated, for example, by utilizing the corrected value, that is given by correcting the number of the temporary stop positions where the vehicle 3 passed according to the predetermined rule, as the number of the passed positions as the denominator and the number of the temporary stop positions where the wake-up call was executed as the number of wake-up calls as the numerator. In this case, if the notification processing part 16 has executed the wake-up call, the counting number after the correction is added to the number of the passed positions as the denominator and "1" as the counting number is added to the number of the wake-up calls as the numerator. In addition, it is preferable that the counting number after the correction is calculated by deducting a predetermined correction counting number set in the correction rule 40 from "1" as the normal counting number (refer to FIG. 6). Further, it is also possible, for example, that the wake-up call ratio that was calculated according to the formula for calculation (1) is corrected by adding or deducting a predetermined value to or from the wake-up call ratio, or multiplying the wake-up call ratio by a predetermined factor.

Figure 20:
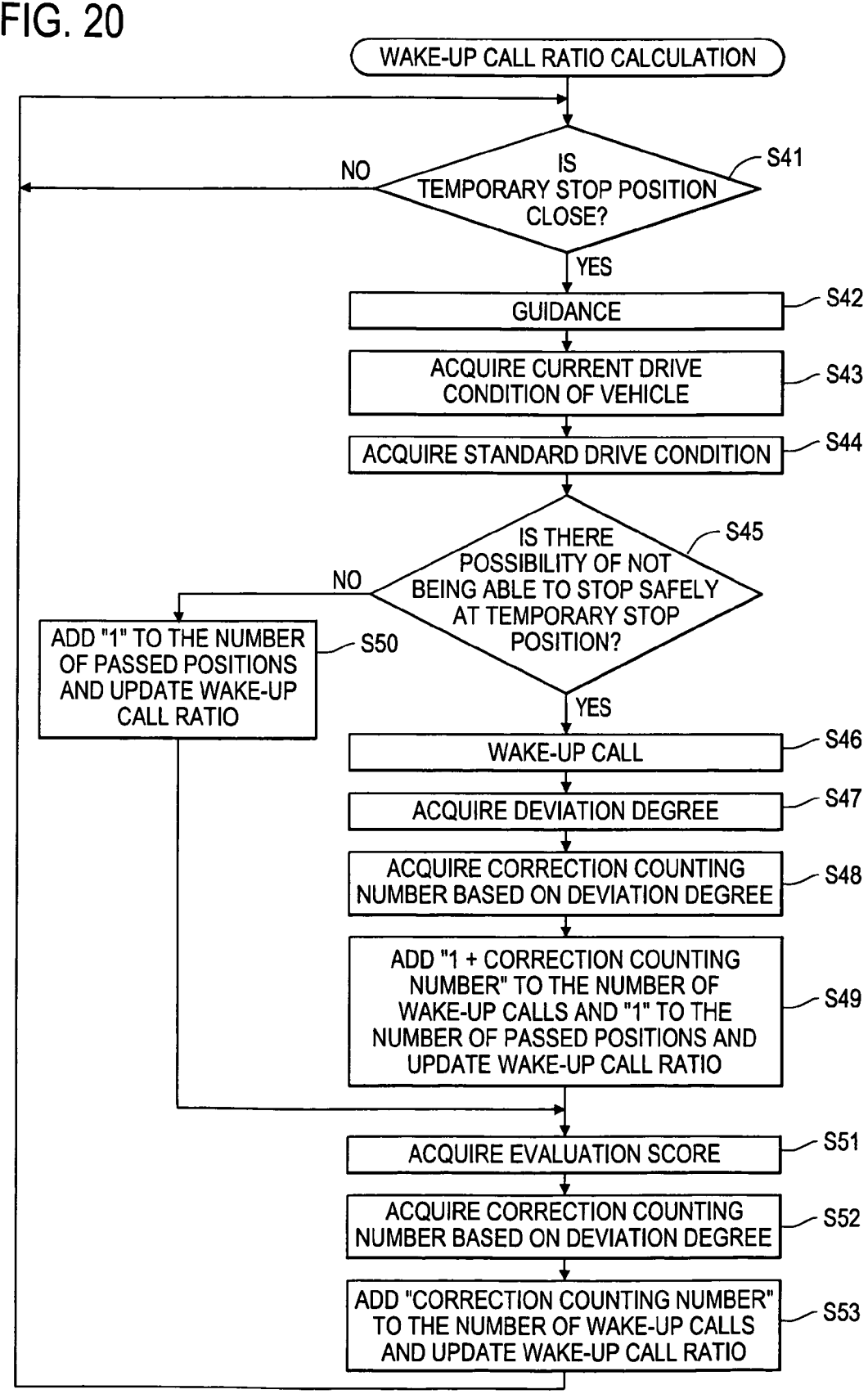
FIG. 20 is a flowchart showing the procedure of the wake-up call ratio calculation processing according to another example.

(3) In the above first example, a case was explained as an example, in which the ratio calculation part 22 corrects the wake-up call ratio according to the evaluation score only when the wake-up call was executed. However, it is also a preferable that the ratio calculation part 22 corrects the wake-up call ratio according to the evaluation score irrespective of whether or not the notification processing part 16 has executed the wake-up call. FIG. 20 is a flowchart showing the procedure of the wake-up call ratio calculation processing in this case. As Steps #41 to #47 are the same as Steps #21 to #27 in the flowchart of FIG. 11, and Steps #48 to #50 are the same as Steps #29 to #31 in the flowchart of FIG. 11, the explanation of Steps #41 to #50 is omitted.

In the illustrated wake-up call ratio calculation processing, after the wake-up call ratio has been updated based on the deviation degree at Steps #41 to #50, the evaluation score acquisition part 18 acquires the evaluation score of when passing the temporary stop position (Step #51). Next, the ratio calculation part 22, based on the evaluation score acquired at Step #51, refers to the correction rule 40 stored in the memory 32 to acquire the correction counting number (Step #52). Here, it is preferable that the higher the evaluation score is, the smaller the correction counting number is set. In addition, it is preferable that the correction counting number is set to be a negative number (0 or less) if the evaluation score is a positive number (0 or more) and the correction counting number is set to be a positive number (more than 0) if the evaluation score is a negative number (less than 0). Then, the ratio calculation part 22 adds the correction counting number acquired at Step #52 to the number of the wake-up calls as the numerator in the formula for calculation of the wake-up call ratio (1), and updates the wake-up call ratio (Step #53). After that, the procedure returns to Step #21. Then, each time the vehicle 3 travels and passes the temporary stop position, the wake-up call ratio is updated and the wake-up call ratio at each moment is calculated. With this structure, if favorable drive operation such as reducing the speed sufficiently before the temporary stop position was performed, the wake-up call ratio is corrected to become small according to the evaluation score irrespective of whether or not the wake-up call was executed. Therefore, it enables the driver to keep an intention further high to practice such driving. In addition, it is also possible to set the correction counting number to be a positive number (0 or more) if the evaluation score is a positive number (0 or more) and the correction counting number to be a negative number (less than 0) if the evaluation score is a negative number (less than 0) and to add the correction counting number to the number of the passed positions as the denominator in calculating the wake-up call ratio at Step #53.

(4) In the above first example, a case was explained, in which all the temporary stop positions are target for calculating the wake-up call ratio. However, it is also possible that if it is supposed that determining whether or not there is a possibility of not being able to stop safely at the temporary position cannot be properly performed, the ratio calculation part 22 excludes the corresponding temporary stop position from targets for calculating the wake-up call ratio. For example, if another vehicle exists ahead of the host vehicle before the temporary stop position, the drive condition of the vehicle 3 before the temporary stop position is influenced by the existence of the other vehicle. And, it is supposed that determining whether or not there is a possibility of not being able to stop safely at the temporary position cannot be properly performed. Therefore, when such condition has been detected, the ratio calculation part 22 excludes the corresponding temporary stop position from targets for calculating the wake-up call ratio. In this manner, it is possible to make the calculated wake-up call ratio much closer to the actual situation and to inform the driver of more appropriate evaluation information 61. In addition, the condition where another vehicle exists ahead of the host vehicle within a predetermined distance can be acquired by a preceding vehicle detection unit such as a millimeter wave radar, a front camera, or the like, which is installed in the vehicle 3.

(5) In the above first example, a case was explained as an example, in which the notification processing part 16 determines whether or not to execute the wake-up call based on the information relating to the braking operation level and the vehicle speed. However, it is also possible to determine whether or not to execute the wake-up call using either the information of the braking operation level or the vehicle speed, or another information such as the information of the accelerator opening.

(6) In the above first example, a case was explained as an example, in which the point information 62, the advice sentence information 63, the evaluation graph information 64, the order information 65, and the rank information 66 are acquired as the evaluation information 61 and outputted such that the driver can be informed of the information. However, it is also a preferable that only a part of the above information is acquired as the evaluation information 61. Also, it is preferable that other kinds of information representing the evaluation relating to the wake-up call ratio are acquired as the evaluation information 61.

(7) In the above first example, a case was explained as an example, in which only the advice sentence information 63 as the evaluation information 61 based on the wake-up call ratio is displayed on the comprehensive evaluation screen, as sentence information for notifying the driver of the vehicle 3 about the evaluation contents toward the drive operation. However, it is also possible, for example, that the advice sentence information based on the evaluation score acquired by the evaluation score acquisition part 18 is displayed. As described above, the evaluation score acquisition part 18 evaluates, at each temporary stop position, the degree of the safe driving for stopping safely at the temporary stop position. Therefore, in the case of displaying the advice sentence information based on the evaluation score, it is preferable that such information is displayed together with the evaluation graph information 64 for sequentially indicating the change in the safe driving ratio during drive of the vehicle 3, as illustrated in FIG. 8. In addition, it is preferable that the advice data for the advice sentence information in such case is stored in the memory 32 together with the evaluation score data 36 using each drive operation as a reference, as illustrated in FIG. 5. By acquiring and displaying the advice sentence information for the evaluation item having a relatively low evaluation score among the respective evaluation scores acquired by the evaluation score acquisition part 18, an appropriate advice that may lead to improve the drive operation can be notified to the driver.

(8) In the above first example, a case was explained as an example, in which the point calculation part 24 included in the navigation device 1 calculates the point of each drive and the total point acquired so far, and stores the points in the memory 32 of the navigation device 1. However, it is also preferable that the information of the point of each drive calculated in the point calculation part 24 is transmitted to the central control server 2 and the total point of each of the vehicles 3 is calculated in the central control server 2, or that the information of the wake-up call ratio of each drive is transmitted to the central control server 2 and the point of each drive and the total point are calculated in the central control server 2. In this case, the navigation device 1 acquires, using the external information acquisition part 27, the information of the total point and the point of each drive of the vehicle 3 from the central control server 2 via the transmitting and receiving part 11 at a predetermined timing.

(9) In the above second and third examples, a case was explained as an example, in which the evaluation part 106 derives the evaluation score E using the accelerator opening change, the vehicle speed change, the following distance change, and the face orientation change as the evaluation items. However, for example, it is also possible that the evaluation score E is derived using absolute amounts of the accelerator opening, the vehicle speed, the braking operation level, and the like, which are acquired by the drive condition acquisition part 14, as the evaluation items.

(10) In the above second and third examples, a case was explained as an example, in which the evaluation part 106 derives the evaluation score E based on both the positive evaluation score and the negative evaluation score. However, it is also possible that the evaluation score E is derived based on either the positive evaluation score or the negative evaluation score. For example, it is also possible that the evaluation score E is derived by a point-addition scoring system based on only the positive evaluation score, or that the evaluation score E is derived by a point-subtraction scoring system from predetermined full points based on only the negative evaluation score. Even in this case, it is preferable that the longer the distance from the temporary stop position is, the higher value is set as the positive evaluation score, and the shorter the distance from the temporary stop position is, the higher value is set as the negative evaluation score.

(11) In the above second example, a case was explained as an example, in which the two areas of A1 and A2 are set between the temporary stop position and the first predetermined location, and the evaluation score table 134, where the basic evaluation scores toward the drive operations for each evaluation item are previously stored for each of the areas A1 and A2, is included. However, it is also possible that three or more areas of A1, A2, A3, . . . are set between the temporary stop position and the first predetermined location, and the evaluation score table 134, where the basic evaluation scores toward the drive operations for each evaluation item are previously stored for each of the areas A1, A2, A3, . . . , is included.

(12) In the above third example, a case was explained as an example, in which the evaluation factor ($\beta$) changes in a linear manner (a linear function) according to the operated distance. However, it is also possible that the evaluation factor ($\beta$) changes in a non-linear manner according to the operated distance. For example, it is possible that the longer the operated distance is, the greater value is set as the evaluation factor ($\beta$) for the positive drive operation and also the increase rate is set to become larger. In addition, it is also possible that the shorter the operated distance is, the greater value is set as the evaluation factor ($\beta$) for the negative drive operation and also the increase rate is set to become larger.

(13) In the above second and third examples, a case was explained as an example, in which, in calculating the total evaluation score, the contribution rate of the evaluation score E for each evaluation item to the total evaluation score is set according to the importance level for stopping the vehicle safely. However, it is also possible that the contribution rate of the evaluation score E for each evaluation item is set equally without taking such importance level into consideration.

(14) In the above second and third examples, a case was explained as an example, in which the advice sentence acquisition part 26, in acquiring the advice information based on the evaluation score E, refers to the evaluation score E for each evaluation item and acquires a comment relating to the evaluation item having a relatively low evaluation score. However, it is also possible to acquire a comment relating to the evaluation item having a relatively high score. With this structure, a comment of praising a preferable drive operation is mainly notified to the driver. Therefore, this enables the driver to keep an intention high to practice such drive operation.

(15) In the above second and third examples, a case was explained, in which the evaluation part 106 derives the evaluation score E each time the host vehicle entered in front of the temporary stop position. However, it is also possible that the evaluation part 106 stops the evaluation of the degree of the safe driving at the temporary stop position under a condition where it is assumed that deriving the evaluation score E is not appropriate. For example, if another vehicle is stopped ahead of the host vehicle before the temporary stop position, the host vehicle has no choice but to stop before such vehicle regardless of the temporary stop position. That is, in such case, the drive operation of the host vehicle before the temporary stop position is influenced by the existence of the other vehicle. And, it is supposed that the degree of the safe driving cannot be properly evaluated with the relation to the temporary stop position. In addition, for example, if the host vehicle location has got off a road including the temporary stop position before arriving at the relevant temporary stop position, the host vehicle does not need to stop at the relevant temporary stop position any more. Then, when such situation has been detected, the evaluation part 106 stops the evaluation of the degree of the safe driving at the relevant temporary stop position. With this structure, it is possible to decrease the notification of the evaluation information unnecessary to the driver and also to reduce a processing load for the evaluation. Further, even after the evaluation score E has been derived by the evaluation part 106, if the host vehicle location has got off the road including the temporary stop position before arriving at the relevant temporary stop position, it is also possible to stop output of the evaluation information to the display input device 47 and the voice output device 48 as the output units. This enables to reduce the notification of the evaluation information at least unnecessary to the driver.

A situation where another vehicle is stopped within the predetermined distance from the temporary stop position can be acquired by the above-mentioned preceding vehicle detection unit. Further, a situation where the host vehicle position has got off the road including the relevant temporary stop position can be acquired based on the host vehicle location information acquired by the host vehicle location information acquisition part 12 and the map data 34 stored in the map database 31.

(16) The assignment of the function parts included in each of the navigation device 1 and the central control server 2, which is explained in the above first example, is only an example. The respective function parts may be provided in any one of the navigation device 1 and the central control server 2, except the function parts required to be provided in the navigation device 1 such as the host vehicle location information acquisition part 12. Consequently, it is also preferable that all the configurations of a travel route evaluation system are provided in the navigation device 1 as the in-vehicle terminal device, for example. In this case, the travel route evaluation system is included in the navigation device 1. In addition, it is also a preferable example that all the main configurations of the travel route evaluation system are provided in the central control server 2 as the central control device, for example. Here, the main configurations of the travel route evaluation system include the notification processing part 16 as the wake-up call unit, the ratio calculation part 22 as the ratio calculation unit, and the evaluation information acquisition part 23 as the evaluation information acquisition unit.

(17) In the same way, it is also possible that a part of the safe driving evaluation device 102 and the navigation device 1 according to the above second and third examples is installed outside the vehicle via a communication network. For example, it is also possible that a part of or all of the respective function parts, the database, and the memory is installed to an external server and the safe driving evaluation processing and the navigation processing are performed via the communication network.

(18) In the respective examples described above, a case was explained as an example, in which the locations of the temporary stop positions are acquired based on the map data 34 (especially, the stop position information) stored in the map database 31 included in the navigation device 1. However, it is also possible to acquire information relating to the temporary stop position (a location coordinate of the temporary stop position, a remaining distance to the temporary stop position, or the like) from information provided from facilities installed outside the vehicle 3 such as road traffic information delivered from VICS (a registered trademark: Vehicle Information and Communication System). In this case, the distance from the temporary stop position to the host vehicle location is estimated based on the information about the vehicle speed detected by the vehicle speed sensor 46. Then, based on the estimated distance from the temporary stop position to the host vehicle location, the processing of the guidance notifying that there is a temporary stop position ahead, the wake-up call processing, or the safe driving evaluation processing is performed.

(19) In the respective examples described above, a case was explained as an example, in which the in-vehicle terminal device included in the safe driving evaluation system or the safe driving evaluation device 102 is the navigation device 1. However, it is also a preferable example of the present invention that the in-vehicle terminal device included in the travel route evaluation system or the respective function parts included in the safe driving evaluation device 102 is a control device of the vehicle 3 that is unrelated to the navigation device 1.

The above examples can be preferably applied to a safe driving evaluation system and a safe driving evaluation program that evaluate whether or not a driver could drive safely before a temporary stop position.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A safe driving evaluation system, comprising:
a controller that:
inputs a current drive condition of a vehicle at a predetermined location before a predetermined temporary stop position;
determines whether there is a possibility that the vehicle will not be able to safely stop at the temporary stop position based on the input current drive condition;
executes a wake-up call to a driver if it is determined that there is a possibility that the vehicle will not be able to stop safely at the temporary stop position;
calculates a wake-up call ratio as a ratio of the total number of wake-up calls executed to the total number of temporary stop positions passed; and
acquires evaluation information based on the calculated wake-up call ratio.

2. The safe driving evaluation system according to claim 1, wherein the controller:
acquires a standard drive condition representing a minimum required drive condition for stopping safely at the temporary stop position;
compares the input current drive condition to the acquired standard drive condition; and
determines, based on the comparison, whether there is the possibility that the vehicle will not be able to safely stop at the temporary stop position.

3. The safe driving evaluation system according to claim 2, wherein the controller:
acquires a deviation degree representing a degree of a deviation between the input current drive condition and the acquired standard drive condition; and
corrects the calculated wake-up call ratio based on the acquired deviation degree.

4. The safe driving evaluation system according to claim 1, wherein the controller:
acquires a degree of safe driving for stopping safely at the temporary stop position; and
corrects the calculated wake-up call ratio based on the acquired degree of safe driving.

5. The safe driving evaluation system according to claim 1, wherein the controller:
acquires the number of accidents that has occurred in the past at each temporary stop position; and
corrects the calculated wake-up call ratio based on the acquired number of accidents.

6. The safe driving evaluation system according to claim 1, wherein the controller:
acquires stop ratio information indicating how often the vehicle actually conducts a stop at each temporary stop position; and
corrects the calculated wake-up call ratio based on the acquired stop ratio.

7. The safe driving evaluation system according to claim 1, further comprising:
a preceding vehicle detection unit that detects whether another vehicle exists within a predetermined distance ahead of the vehicle;
wherein, if another vehicle exists ahead of the vehicle when the vehicle is at the predetermined location, the controller excludes the temporary stop position corresponding to the predetermined location from the calculation of the wake-up call ratio.

8. The safe driving evaluation system according to claim 1, wherein the input current drive condition is at least one of the vehicle's speed, a braking operation level, and an accelerator opening.

9. The safe driving evaluation system according to claim 1, wherein the evaluation information includes at least one of:
a score assigned according to the wake-up call ratio;
an advice sentence having contents corresponding to the wake-up call ratio; and
a graphic display visually showing the wake-up call ratio at each moment.

10. The safe driving evaluation system according to claim 1, further comprising:
an information collection unit that collects information related to the wake-up call ratio from a plurality of other vehicles;
wherein the controller acquires, based on the collected information, at least one of the following as the evaluation information:
an order of the vehicle and each of the plurality of other vehicles, the order being determined based on a comparison of the wake-up call ratio of the vehicle to the wake-up call ratios of the plurality of the other vehicles; and
a rank assigned to the vehicle based on the past wake-up call ratios of each of the plurality of vehicles.

11. The safe driving evaluation system according to claim 1, comprising:
an in-vehicle terminal device mounted in the vehicle; and
a central control device communicable with a plurality of other in-vehicle terminal devices;
wherein:
when a main power of the vehicle has been turned off, the in-vehicle terminal device sends the wake-up call ratio to the central control device; and
the central control device generates the evaluation information for the in-vehicle terminal device based on the sent wake-up call ratio.

12. A navigation system comprising the safe driving evaluation system according to claim 1.

13. A safe driving evaluation method, comprising:
inputting a current drive condition of a vehicle at a predetermined location before a predetermined temporary stop position;
determining whether there is a possibility that the vehicle will not be able to safely stop at the temporary stop position based on the input current drive condition;
executing a wake-up call to a driver if it is determined that there is a possibility that the vehicle will not be able to stop safely at the temporary stop position;
calculating a wake-up call ratio as a ratio of the total number of wake-up calls executed to the total number of temporary stop positions passed; and
acquiring evaluation information based on the calculated wake-up call ratio.

14. The safe driving evaluation method according to claim 13, further comprising:
acquiring a standard drive condition representing a minimum required drive condition for stopping safely at the temporary stop position;
comparing the input current drive condition to the acquired standard drive condition; and
determining, based on the comparison, whether there is the possibility that the vehicle will not be able to safely stop at the temporary stop position.

15. The safe driving evaluation method according to claim 14, further comprising:
acquiring a deviation degree representing a degree of a deviation between the input current drive condition and the acquired standard drive condition; and
correcting the calculated wake-up call ratio based on the acquired deviation degree.

16. The safe driving evaluation method according to claim 13, further comprising:
acquiring a degree of safe driving for stopping safely at the temporary stop position; and
correcting the calculated wake-up call ratio based on the acquired degree of safe driving.

17. The safe driving evaluation method according to claim 13, further comprising:
acquiring the number of accidents that has occurred in the past at each temporary stop position; and
correcting the calculated wake-up call ratio based on the acquired number of accidents.

18. The safe driving evaluation method according to claim 13, further comprising:
acquiring stop ratio information indicating how often the vehicle actually conducts a stop at each temporary stop position; and
correcting the calculated wake-up call ratio based on the acquired stop ratio.

19. The safe driving evaluation method according to claim 13, wherein the method is implemented by a controller in an in-vehicle device.

20. A computer-readable storage medium storing a computer-executable program for safe driving evaluation, the program comprising:
instructions for inputting a current drive condition of a vehicle at a predetermined location before a predetermined temporary stop position;
instructions for determining whether there is a possibility that the vehicle will not be able to safely stop at the temporary stop position based on the input current drive condition;
instructions for executing a wake-up call to a driver if it is determined that there is a possibility that the vehicle will not be able to stop safely at the temporary stop position;
instructions for calculating a wake-up call ratio as a ratio of the total number of wake-up calls executed to the total number of temporary stop positions passed; and
instructions for acquiring evaluation information based on the calculated wake-up call ratio.

* * * * *